United States Patent
Marti et al.

(10) Patent No.: US 8,849,308 B2
(45) Date of Patent: Sep. 30, 2014

(54) TILING OF MAP DATA

(71) Applicant: Apple Inc., Cupertino, CA (US)

(72) Inventors: Lukas M. Marti, Santa Clara, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/683,401

(22) Filed: Nov. 21, 2012

(65) Prior Publication Data

US 2014/0141803 A1    May 22, 2014

(51) Int. Cl.
*H04W 24/00* (2009.01)
*H04W 4/04* (2009.01)

(52) U.S. Cl.
CPC ..................... *H04W 4/043* (2013.01)
USPC ..................... 455/456.2; 455/456.1

(58) Field of Classification Search
USPC .......................... 455/414.1–414.4, 456.1–457
See application file for complete search history.

(56) References Cited

U.S. PATENT DOCUMENTS

| | | | |
|---|---|---|---|
| 7,606,687 B2 * | 10/2009 | Galbreath et al. ................. 703/3 |
| 7,761,233 B2 | 7/2010 | Schott |
| 8,046,163 B2 | 10/2011 | Rashid |
| 8,229,164 B2 | 7/2012 | Miyamoto et al. |
| 8,290,511 B2 | 10/2012 | Burdo |
| 8,392,107 B2 | 3/2013 | Patel |
| 8,494,762 B2 | 7/2013 | Patel |
| 8,498,811 B2 | 7/2013 | Lundquist |
| 8,538,389 B1 | 9/2013 | Evans |
| 8,594,701 B2 | 11/2013 | Pakzad |
| 2008/0167049 A1 | 7/2008 | Karr |
| 2009/0061903 A1 | 3/2009 | Khokhar |
| 2009/0265104 A1 | 10/2009 | Shroff |
| 2010/0039929 A1 | 2/2010 | Cho |
| 2011/0178705 A1 | 7/2011 | Pakzad |
| 2011/0196647 A1 | 8/2011 | Peraelae |
| 2012/0007779 A1 | 1/2012 | Klepal |
| 2012/0066035 A1 * | 3/2012 | Stanger et al. ................ 705/14.1 |

(Continued)

OTHER PUBLICATIONS

Ascher et al., "Dual IMU Indoor Navigation with Particle Filter Based Map-Matching on a Smartphone", 2010 International Conference on Indoor Positioning and Indoor Navigation (IPIN), pp. 1-5, Sep. 15-17, 2010, Zürich, Switzerland.

(Continued)

*Primary Examiner* — Kashif Siddiqui
(74) *Attorney, Agent, or Firm* — Fish & Richardson P.C.

(57) ABSTRACT

A mobile device can send a request to a server having a plurality of tiles of location data associated with a venue, each tile having location data associated with a portion of the venue, the request including data representing an estimated location of the mobile device. The mobile device can receive a first tile of location data sent from the server, the first tile being associated with a first portion of the venue that includes the estimated location. The mobile device can receive a first sensor reading and determine a first location of the mobile device at the venue using the first sensor reading and the first tile of location data. The mobile device may receive a second tile of location data sent from the server, the second tile being associated with a second portion of the venue. The mobile device may receive a second sensor reading and determine a second location of the mobile device at the venue using the second sensor reading and the second tile of location data.

25 Claims, 25 Drawing Sheets

(56) References Cited

U.S. PATENT DOCUMENTS

| | | | |
|---|---|---|---|
| 2012/0232795 | A1 | 9/2012 | Robertson |
| 2012/0302263 | A1 | 11/2012 | Tinnakornsrisuphap |
| 2012/0310591 | A1 | 12/2012 | Win |
| 2013/0102248 | A1 | 4/2013 | Jay |
| 2013/0141233 | A1 | 6/2013 | Jacobs |
| 2013/0257657 | A1 | 10/2013 | Garin |
| 2013/0339478 | A1 | 12/2013 | Edge |

OTHER PUBLICATIONS

Davidson et al., "Application of Particle Filters for Indoor Positioning Using Floor Plans", Ubiquitous Positioning Indoor Navigation and Location Based Service (UPINLBS), 4 pages, Oct. 14-15, 2010.

Joshi, "A New Approach to Map Matching for In-Vehicle Navigation Systems: The Rotational Variation Metric", 2001 IEEE Intelligent Transportation Systems Conference Proceedings—Oakland (CA), USA pp. 33-38, Aug. 25-29, 2001.

Peker et al., "Particle Filter Vehicle Localization and Map-Matching Using Map Topology", 2011 IEEE Intelligent Vehicles Symposium (IV) Baden-Baden, Germany, pp. 248-253, Jun. 5-9, 2011.

Wakuda et al., "An Adaptive Map-Matching Based on Dynamic Time Warping for Pedestrian Positioning Using Network Map", Position Location and Navigation Symposium (PLANS), 2012 IEEE/ION, pp. 590-597, Apr. 23-26, 2012.

Yang et al., "An Improved Map-Matching Algorithm Used in Vehicle Navigation System", Intelligent Transportation Systems, 2003. Proceedings of IEEE, pp. 1246-1250.

Zhao et al., "A Map Matching Algorithm in GPS-based Car Navigation System", Intelligent Information Hiding and Multimedia Signal Processing, 2007. IIHMSP 2007. Third International Conference, pp. 77-80, Nov. 26-28, 2007.

Authorized Officer Heinz Senkel, Notification of Transmittal of the International Search Report and Written Opinion of the International Searching Authority, International Application No. PCT/US2013/070735, mailed Mar. 27, 2014, 14 pages.

Spassov, "Algorithms for Map-Aided Autonomous Indoor edestrian Positioning and Navigation", http://biblion.epfl.ch/EPFL/theses/2007/3961/EPFL_TH3961.pdf, Nov. 23, 2007.

Widyawan et al., "A novel backtracking particle filter for pattern matching indoor localization", Proceedings of the First ACM International Workshop on Mobile Entity Localization and Tracking in GPS-LESS Environments, MELT '08, Jan. 1, 2008.

Chao et al., "Location-Constrained Particle Filter for RSSI-Based Indoor Human Positioning and Tracking System", IEEE Workshop on Signal Processing Systems, Oct. 8, 2008, pp. 73-76.

Widyawan et al., "Influence of Predicted and Measured Fingerprint on the Accuracy of RSSI-based Indoor Location Systems", 4th Workshop on Positioning, Navigation and Communication 2007 (WPNC '07), IEEE, Mar. 1, 2007, pp. 145-151.

Zhuang et al., "SMART: Simultaneous Indoor Localization and Map Construction Using Smartphones", 2010 International Joint Conference on Neural Networks (IJCNN), Jul. 18, 2010, pp. 1-8.

Authorized Officer Heinz Senkel, Notification of Transmittal of the International Search Report and Written Opinion of the International Searching Authority, International Application No. PCT/US2013/070738, mailed Feb. 18, 2014, 12 pages.

\* cited by examiner

TILING OF MAP DATA

TECHNICAL FIELD

This disclosure relates generally to location determination.

BACKGROUND

Some mobile devices have features to determine a geographic location. For example, a mobile device can include a receiver for receiving signals from a global positioning system (GPS). The mobile device can determine a geographic location, including latitude and longitude, using the GPS signals. In many places, GPS signals can be non-existent, weak, or subject to interference such that it is not possible to determine a location using the GPS receiver on a mobile device. For example, a conventional mobile device often fails to determine a location based on GPS signals when the device is inside a building or tunnel.

SUMMARY

Methods, program products, and systems for using a map tiles to determine a location of a mobile device are described. To reduce memory and storage requirements at the mobile device and to reduce the time needed to provide an initial location estimate, a mobile device can download different map tiles on an as-needed basis as the mobile device moves to different regions in a venue, and use the map tiles to determine the location.

In one aspect, a mobile device can send a request to a server having a plurality of tiles of location data associated with a venue, the venue including a space accessible by a movable body carrying the mobile device and one or more constraints of movement of the movable body. Each tile has location data associated with a portion of the venue, the request including data representing an estimated location of the mobile device. The mobile device can receive a first tile of location data sent from the server, the first tile being associated with a first portion of the venue that includes the estimated location. The mobile device can receive a first sensor reading from a sensor of the mobile device and determine a first location of the mobile device at the venue using the first sensor reading and the first tile of location data. The mobile device may receive a second tile of location data sent from the server, the second tile being associated with a second portion of the venue. The mobile device may receive a second sensor reading from the sensor, and determine a second location of the mobile device at the venue using the second sensor reading and the second tile of location data.

In one aspect, a mobile device can receive a subset of tiles selected from a plurality of tiles of location data from a server, the plurality of tiles being associated with a venue comprising a space accessible by a pedestrian and one or more constraints of movement of the pedestrian. Each tile has location data associated with a portion of the venue. The mobile device can determine a location estimate of the mobile device using the locally stored subset of tile or tiles of location data and a reading from a sensor of the mobile device. The mobile device can update the locally stored subset of tile or tiles by downloading a new tile from the server, the new tile selected based on the location estimate, and determine an updated location estimate of the mobile device using the updated locally stored subset of tile or tiles of location data and an updated reading from the sensor of the mobile device.

In one aspect, a mobile device can determine a first estimated location of the mobile device, download a first tile of map data from a server based on the first estimated location, the first tile representing a first region that includes the first estimated location. The coordinates of the map data in the first tile can be converted according to a reference coordinate system to generate first converted map data, and a second estimated location of the mobile device can be determined using the first converted map data. The mobile device can download a second tile of map data from the server based on the second estimated location, the second tile representing a second region that includes the second estimated location. The coordinates of the map data in the second tile can be converted according to the reference coordinate system to generate second converted map data, and a third estimated location of the mobile device can be determined using the second converted map data.

In one aspect, a mobile device includes a sensor to sense an environment variable, and a storage configured to locally store a subset of a plurality of tiles associated with a venue, the venue comprising a space accessible by a movable body carrying the mobile device and one or more constraints of movement of the movable body, each tile having location data associated with a portion of the venue. The mobile device includes a processor configured to determine a location estimate of the mobile device using the locally stored subset of tile or tiles of location data and a reading from the sensor, and update the locally stored subset of tile or tiles based on the location estimate of the mobile device by downloading a new tile of location data from a server that stores the plurality of tiles associated with the venue.

The map tiles can be implemented to achieve the following advantages. A mobile device can determine a location quickly after downloading a portion of map data associated with a venue. The mobile device can obtain location fingerprint data on an as-needed basis. For example, the mobile device can obtain location fingerprint data for a building only when the mobile device is about to enter the building. The mobile device can obtain location fingerprint data for a floor in the building only when the mobile device is about to enter the floor. The mobile device can obtain location fingerprint data for a section of a floor only when the mobile device is about to enter the section. Accordingly, the memory footprint, network bandwidth usage, and processor load for location determination can be minimized.

By using local coordinates for map data in each map tile, the map data for each tile can be generated independently of the other map tiles. By converting the coordinates of the map data in each map tile to global coordinates that use the venue origin as reference, a location estimator can process the map data from different tiles the same way.

The details of one or more implementations of location determination using map tiles are set forth in the accompanying drawings and the description below. Other features, aspects, and advantages of location determination using map tiles will become apparent from the description, the drawings, and the claims.

BRIEF DESCRIPTION OF THE DRAWINGS

Like reference symbols in the various drawings indicate like elements.

DETAILED DESCRIPTION

Tiling of Map Data

A mobile device can determine its location in a venue based on map data associated with the venue. The map data can be downloaded from a server through a wireless network connection. The map data can be divided into several files, referred to as "map tiles" or "tiles," in which each tile includes map data associated with a portion of the venue. For example, if the venue is a multi-floor building, each tile may include map data associated with one floor of the building. A single floor can also be divided into multiple tiles. For example, if the venue is a large shopping mall, each floor of the mall may be divided into several sections, and each tile can include map data associated with one of the sections. When a user carrying the mobile device walks around the venue, relevant tiles of map data are downloaded to the mobile device and used to determine the location of the mobile device. By downloading map data associated with a portion of the venue instead of the entire venue, the amount of memory required to store the map data at the mobile device can be reduced. The amount of time required to wait for the map data to be downloaded can also be reduced, allowing the mobile device to provide fast location estimates for a given venue, resulting in a better user experience.

In this description, the mobile device can be, for example, a cell phone, a personal digital assistant, a tablet computer, a laptop computer, a camera, a music player, a video player, a video recorder, or any other portable device that provides the function of location estimation.

The map data in each tile can include, e.g., blueprints of the venue, information about pathways (e.g., walkable routes), information about walls or other obstructions that a human cannot pass through, and a location fingerprint database. The location fingerprint database can include a radio frequency heat map that shows the radio frequency signatures for a given location. The radio frequency signatures can include signatures of WiFi signals, Bluetooth signals, and other type of radio frequency signals.

Figure 1:
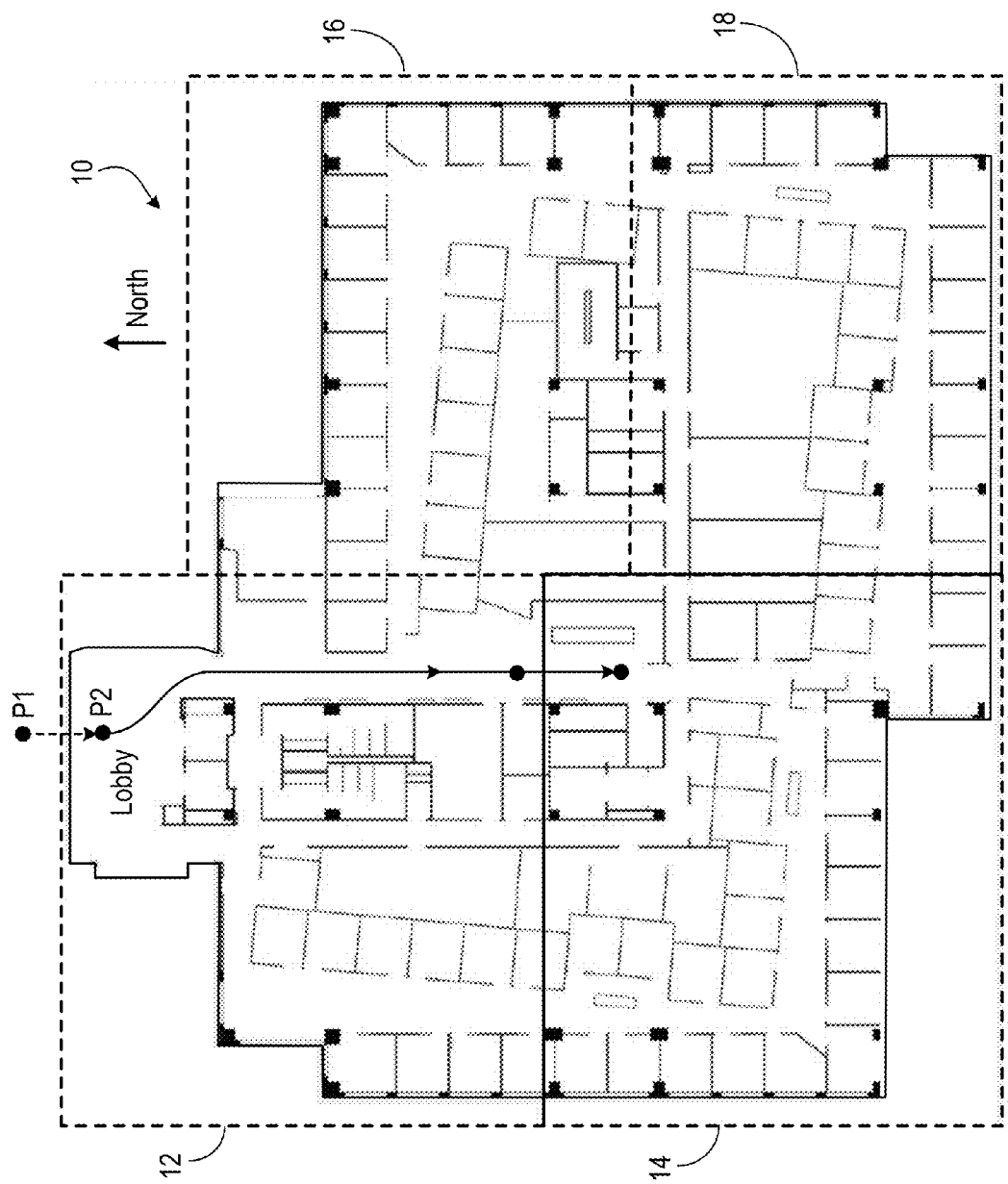
FIG. 1 is a diagram of an exemplary map of a venue divided into several tiles.

Referring to FIG. 1, map 10 of a floor can be divided into four sections or tiles 12, 14, 16, and 18. Assume that map 10 represents the floor plan of a first floor of a building. A user carrying a mobile device may use Global Positioning System (GPS) to determines his location at an outdoor location, e.g., at location P1. When the user enters the lobby of the building, e.g., at location P2, the mobile device may switch to an indoor navigation mode and send a request to a map server for a relevant tile of map data.

For example, the mobile device may send the map server the last GPS coordinates prior to entering the building. The map server may determine that the user is entering the building through the north entrance and entering the lobby, so the map server sends map tile 102 to the mobile device. Upon receiving map tile 102, the mobile device determines that it is at location P2, in the lobby.

In some implementations, the map server also sends basic information about the other map tiles associated with the venue. For example, each map tile may cover a rectangular region, and the map tile can be identified by the coordinates of the northwest (upper-left) and southeast (lower-right) corners of the map tile. In the example of FIG. 1, the map server may send the coordinates of the northwest and southeast corners of map tiles 14, 16, and 18 to the mobile device. When the mobile device is in the region covered by map tile 12, the mobile device can determine its accurate position using the detailed map data for map tile 12 downloaded from the map server upon entering the lobby.

When the mobile device moves outside of the region covered by map tile 12 and enters a new region, the mobile device can determine which map tile covers the new region based on the basic information about the map tiles (i.e., the coordinates of the northwest and southeast corners of the map tiles 14, 16, and 18).

For example, the user may walk from the lobby through a corridor toward a location P4 outside of the region covered by map tile 12. The mobile device determines that location P4 is in tile 14, and sends a request to the map server to request detailed map data for map tile 14.

In some implementations, the mobile device can predict where the user is going and download a new map tile in advance so that by the time the user walks to the new region covered by the new map tile, the new map tile has already been downloaded so that there is no interruption in providing location information by the mobile device.

For example, as the user walk from the lobby through the corridor to a location P3, the mobile device determines that the user is approaching a border of map tile 12. Based on the general walking direction, the mobile device determines that the user will soon enter the region covered by map tile 14, and thus sends a request to the map server to request the detailed map data for map tile 14. By the time the user enters the region covered by map tile 14, the detailed map data for map tile 14 has already been downloaded to the mobile device. The mobile device can continue to determine the location of the user, such as at location P4.

In some implementations, when the mobile device is in a region associated with a map tile (e.g., map tile 12), the mobile device determines whether there are adjacent map tiles (e.g., map tiles 14 and 16), and downloads the detailed map data for all adjacent map tiles in advance. When the mobile device enters another region, e.g., the region associated with map tile 16, the mobile device downloads the detailed map data for new adjacent map tiles (e.g., map tile 18), if available.

The map tiles that have been downloaded are stored at the mobile device until a preset memory limit is reached. Afterwards, when a new map tile is downloaded, an old map tile is removed from memory. For example, the map tile covering a region that is farthest from the mobile device's current location may be chosen and removed from the memory.

The map tiles removed from the memory may be stored in a cache in, e.g., a hard drive or solid state drive. For example, suppose the mobile device can store at most two map tiles in the memory. When the user walks to the region covered by map tile 18, map tile 12 may be removed from the memory and stored in the hard drive. When the user walks back to the region covered by map tile 12, the mobile device retrieves map tile 12 from the hard drive and loads it into the memory.

In some implementations, the map information contained in each tile uses local coordinates that use a local reference point within the map tile. A location in the venue is designated as the venue origin and used as a global reference point for all the map data associated with the venue. Each map tile includes information indicating an offset of the local reference point relative to the global reference point of the venue. The map data using local coordinates can be conveniently converted to map data using global coordinates. This allows map data from multiple map tiles to be combined easily. Another advantage is that location estimators (e.g., particle filter and fingerprint engine, described below) executing on the mobile device can operate in the global coordinate frame and do not need to know about the individual tiles.

An arbitrary point in a venue can be selected as the venue origin, which is used as a global reference point for all map data associated with the venue. For example, if the venue is a campus, the center of the campus can be selected as the venue origin. If the venue is a building, the center of the first floor of the building can be selected as the venue origin.

Figure 2:
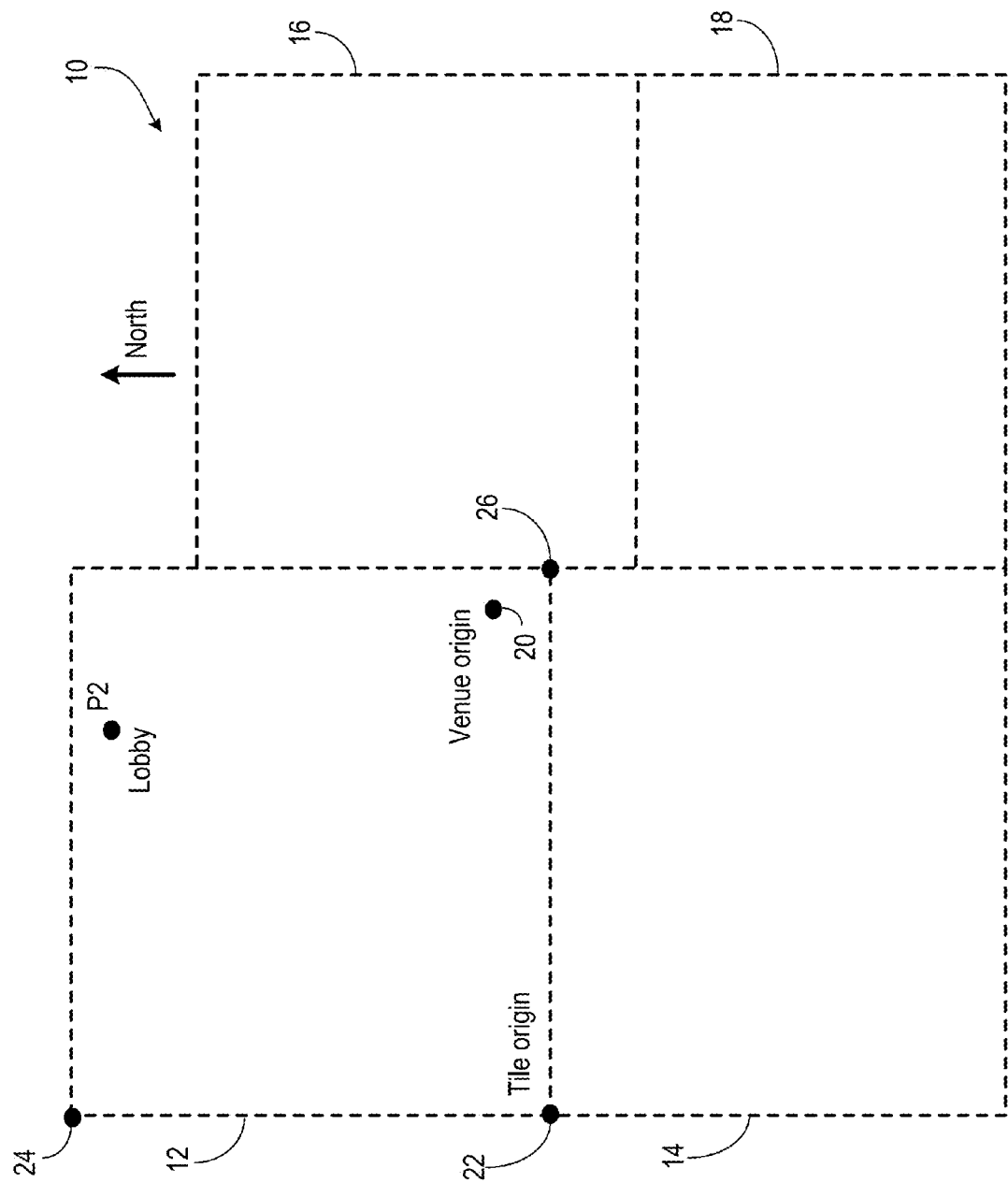
FIG. 2 is a diagram of map tiles associated with the venue of FIG. 1.

Referring to FIG. 2, a location near the center of the first floor of the venue in the example of FIG. 1 is selected as a venue origin 20. The venue origin 20 can be represented by its latitude, longitude, height, and floor coordinates.

In some implementations, each map tile has a rectangular shape that can be identified by its top-left (northwest) and bottom-right (southeast) latitude, longitude, and floor (LLF) coordinates. Each map tile includes global coordinates of a tile origin that is used as a local reference. The global coordinates of the tile origin represents an offset of the tile origin relative to the venue origin. For example, the southwest corner of map tile 12 may be used as tile origin 22. Local map data can have, e.g., east-north-up (ENU) coordinates using tile origin 22 as a reference point.

A map tile can be stored as a folder having a collection of files, such as a coordinate file that contains the top-left and bottom-right LLF coordinates, a map file that serves as a blueprint for the area represented by the map tile, a pathways file that contains the walkable routes in addition to floating-area spaces (e.g. rooms or offices), and a location fingerprint file that includes, e.g., a WiFi fingerprint database. For example, the coordinate file and the pathways file can be XML files, and the map file can be a bitmap file.

After a map tile is downloaded to the mobile device, the mobile device can measure one or more environment variables, such as WiFi signal strength, and uses a fingerprint engine to compare the measured signals with the location fingerprint database included in the map tile, such as the WiFi fingerprint database, to determine a rough estimate of its location. The output of the fingerprint engine can be sent to a location estimator (e.g., a particle filter) using a state space model that takes into account information about constraints to movement, such as walls, fountains, columns, and other obstacles in the venue, and information about the pathways in the venue, to determine a more accurate estimate of the location of the mobile device.

In the example of FIG. 2, suppose tile origin has a global coordinate of (−60, −5, 10), and location P2 has a local coordinate of (50, 55, 0). For example, the location P2 may represent the location of a WiFi signal source. Converting the local coordinates of the location P2 (which uses tile origin 22 as reference) to the global coordinate system (which uses venue origin 20 as reference) results in the location P2 having global coordinates (−10, 60, 10).

Figure 3:
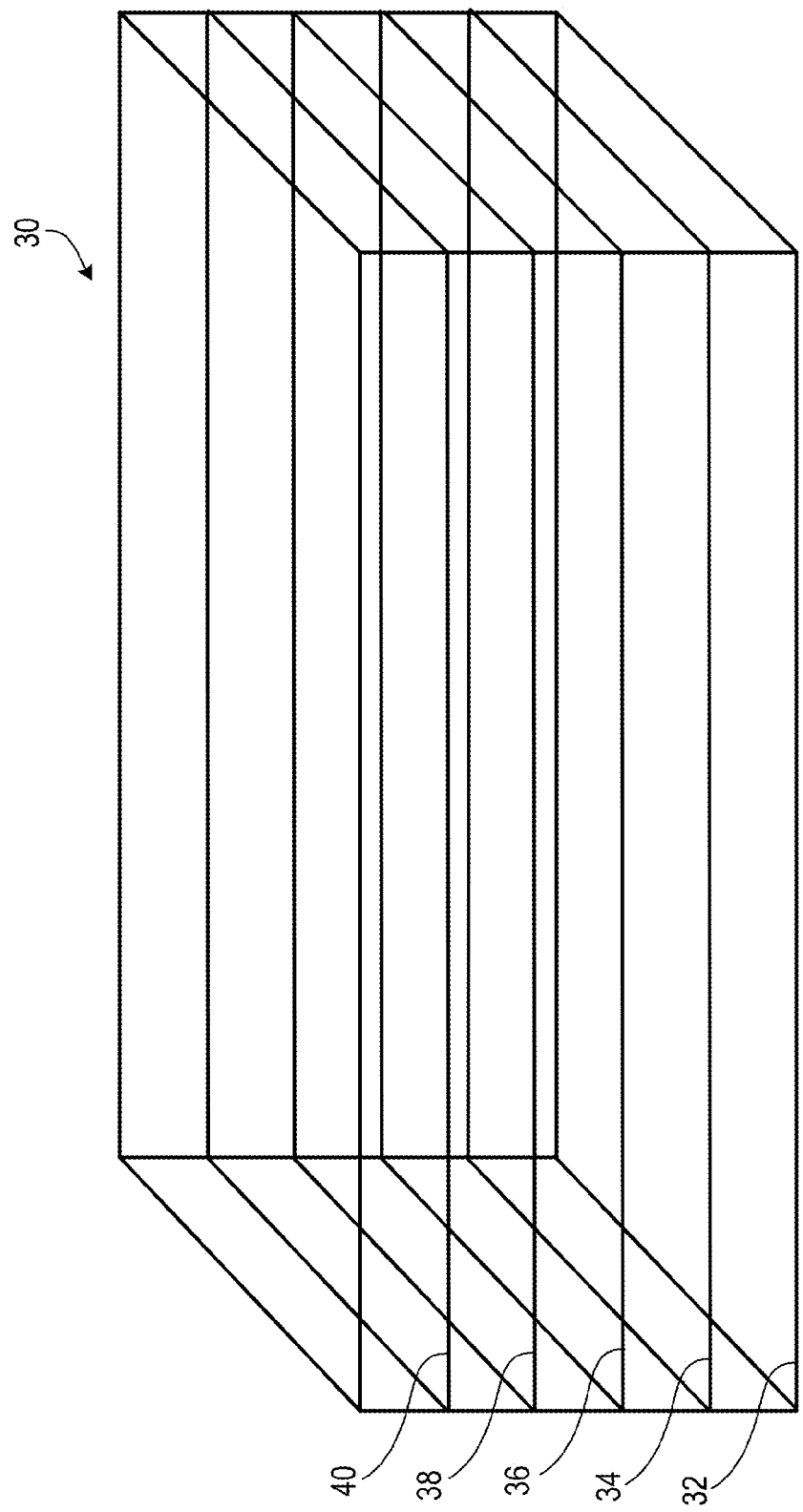
FIG. 3 is a diagram of an exemplary venue that includes multiple floors.

Referring to FIG. 3, an exemplary venue 30 is a building that has five floors, in which the first to the fifth floors associated with map tiles 32, 34, 36, 38, and 40, respectively. A user may use a mobile device that includes a GPS engine, a fingerprint engine, and a location estimator using a state space model to determine its location. When the user is at an outdoor location, the mobile device uses the GPS engine to determine its location. When the user enters the building through the first floor, the mobile device sends a request to a map server to download map tile 32 for the first floor and information about the top-left and bottom-right latitude, longitude, and floor coordinates of map tiles 34, 36, 38, and 40. The mobile device uses map tile 32 to determine its location within the first floor of the building.

When the user takes the stairs, an elevator, or an escalator to the second floor, the mobile device sends a request to the map server to download map tile 34, and uses map tile 34 to determine its location within the second floor of the building, and so forth. The mobile device may include an altitude sensor that detects changes in atmospheric pressure to detect that the user is walking to a different floor.

Overview of System for Location Determination

Figure 4:
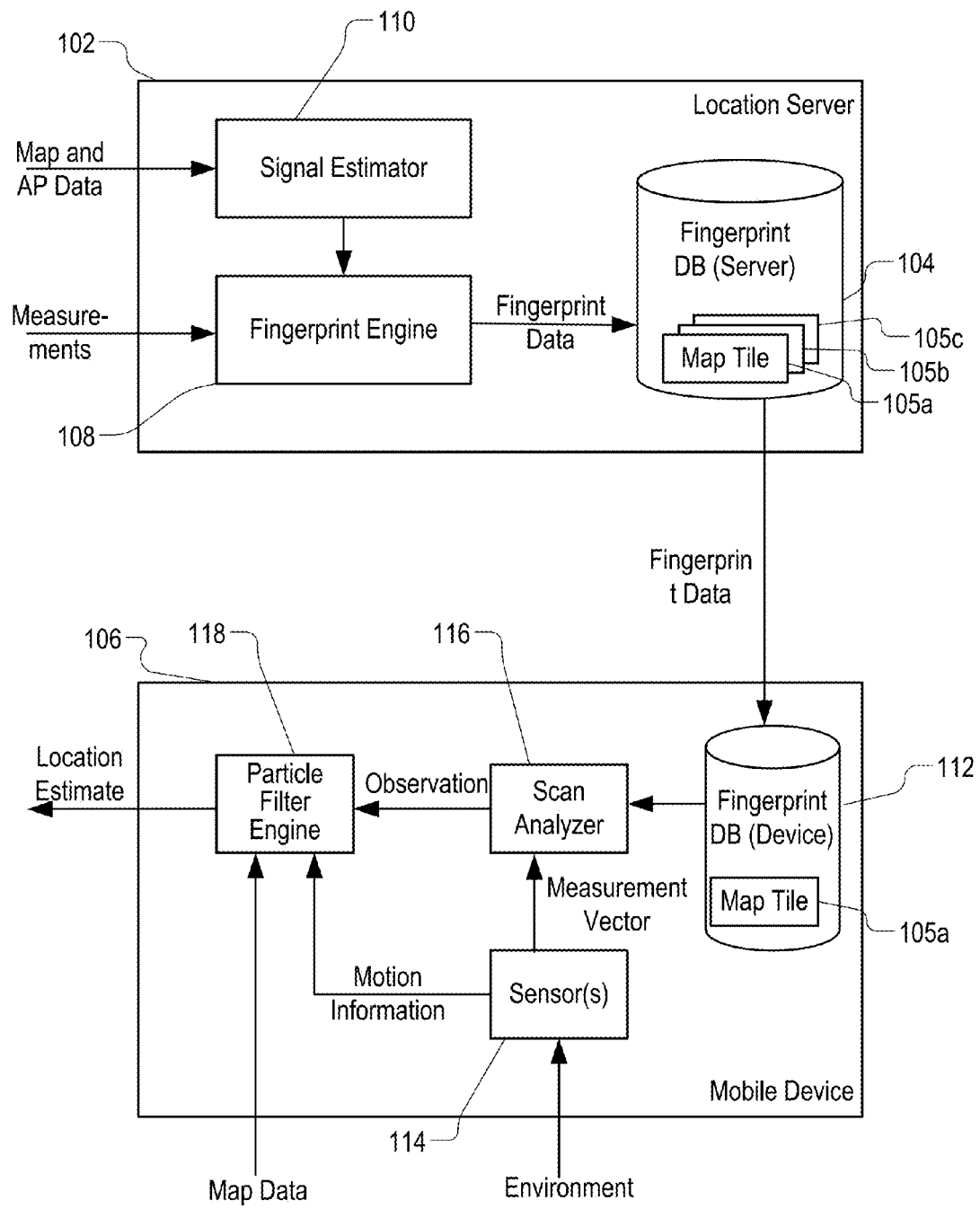
FIG. 4 is a block diagram providing an overview of location determination using location fingerprint data.

FIG. 4 is a block diagram providing an overview of location determination using location fingerprint data. Location server 102 can include one or more computers programmed to generate location fingerprint data and store the location fingerprint data in location fingerprint database 104. The fingerprint data for a venue can be divided into several map tiles, such as map tile 105a, 105b, and 105c. Location server 102 can provide the location fingerprint data to mobile device 106. Mobile device 106 can determine a location of mobile device 106 using the location fingerprint data received from location server 102.

The location fingerprint data generated by location server 102 can include a set of features associated with a venue. The venue can be a space accessible by a pedestrian. The venue can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). The venue can be a physical structure. The physical structure can be closed (e.g., a building) or open (e.g., an open stadium). The space can be indoor space inside of the physical structure, or space inside of a bounding space of the physical structure if the physical structure is open. The venue can be mobile (e.g., an airplane, a cruise ship, or a mobile oil platform).

For example, a venue can be a multi-story office building having a lobby, offices, walls, doors, elevators, and hallways. A pedestrian can be a human or a device that moves at a speed that is similar to a human's walking or running speed.

Location server 102 can generate the location fingerprint data by designating measurements of environment variables as the set of features associated with a venue. The environment variables can be signals from one or more signal sources. The measurements of environment variables can include data obtained through one or more Wi-Fi™ access point radio frequency (RF) scans. The data can include service set identifier (SSID) or received signal strength indicator (RSSI). The measurements of environment variables can include magnetic field properties, including static and dynamic properties. For example, the measurements can include a magnitude and a direction of a magnetic field and their respective rate of change. The measurements of environment variables can include Bluetooth™ scan data, e.g., an identifier or RSSI. The measurements of environment variables can include cellular data, e.g., cell identifier or RSSI. The measurements of environment variables can include vision-based features, e.g., light intensity, color, or visual features determined by a feature recognition device. The measurements of signals can include measurement of near field communication (NFC) signals or radio frequency identification (RFID) signals.

Location server 102 can generate location fingerprint data using fingerprint engine 108. Fingerprint engine 108 can generate the location fingerprint data using survey or prediction. To generate location fingerprint data using survey, fingerprint engine 108 can receive crowd-sourced data, or survey data, from one or more sampling devices. Fingerprint engine 108 can generate the location fingerprint data based on the received crowd-sourced data using interpolation. The crowd-sourced data can include measurements of environment variables submitted by the one or more sampling devices. Each sampling device can be a mobile device having a sensor (e.g., an RF receiver) for measuring an environment variable (e.g., an RF signal) and configured to provide the measurement to fingerprint engine 108. To measure the signal, the sampling device can be programmed to record detectable signals while being placed at various sampling points. For example, a user or a vehicle can carry the sampling device and walk or otherwise travel (e.g., move up or down with an elevator) inside of venue (e.g., a building). Meanwhile, the sample device can record measured signals, and submit the recorded signals to location server 102 in real time or in batches. The recorded signals can be from diverse signal sources. For example, the recorded signals can include some or all of magnetic field measurements, RF measurements, and light measurements. The recorded measurements and interpolation can be associated with the venue.

To generate location fingerprint data using prediction, fingerprint engine 108 can use predicted signal measurements generated by signal estimator 110. Predication can include extrapolation using truth data on access points. The truth data can include known locations of the access points. Signal estimator 110 can be a component of location server 102 that is configured to generate estimated signal measurements based on a map (or other structural information specifying signal barriers) of a venue and the known locations of signal sources in the venue. Signal estimator 110 can receive the map, the locations, and attributes of signal sources. Signal estimator 110 can determine an estimated signal measurement at a given location based on attributes of the signal sources, locations of the signal sources, and features in the map. For example, signal estimator 110 can determine one or more sampling points in a venue, and determine a distance between a sampling point and a wireless access point. Based on a type, make, or model of the wireless access point, signal estimator 110 can determine a signal strength of the access point. Based on number of walls between the sampling point and the access point, signal estimator 110 can determine an attenuation of signal from the access point. Using the signal strength and attenuation, signal estimator 110 can determine the estimated measurement (e.g., RSSI) at the sampling point and provide the estimated measurement and coordinates of the sampling point to fingerprint engine 108.

Location server 102 can send location fingerprint data to mobile device 106 upon receiving a request from mobile device 106. Mobile device 106 can send the request to location server 102 on an as-needed basis, for example, when mobile device 106 enters a venue. Mobile device 106, upon receiving the location fingerprint data, can store the location fingerprint data in location fingerprint database 112. Mobile device 106 may initially receive one map tile, e.g., map tile 105a, from the location server 102. As mobile device 106 moves to different regions in the venue, mobile device downloads additional map tiles from the location server 102. Mobile device 106 can obtain a set of measurements of environment variables (e.g., results from one or more Wi-Fi™ scans) using sensors 114. Sensors 114 can send the measurements to scan analyzer 116 as measurement vectors. Scan analyzer 116 can be a component of mobile device 106 configured to derive a highest probable location of mobile device 106 based on the measurement vectors and location fingerprint data. Mobile device 106 can use scan analyzer 116 to match readings in the measurement vectors from sensors 114 against location fingerprint data stored in location fingerprint database 112. The match can be multi-dimensional. For example, the match can be performed on a signal source dimension (measurement of signal source 1, measurement of signal source 2 . . . ) and a location dimension (e.g., latitude, longitude, and altitude). The match can include a statistical classification of the measurement vectors where the location fingerprint data are training data for the statistical classification. Scan analyzer 116 can derive the highest probable location as a function of the multidimensional match.

At mobile device 106, prior to sending map tile 105 including the fingerprint data to scan analyzer 116, the coordinates of map data in map tile 105 are converted from local coordinates (that use the tile origin as reference) to global coordinates (that use the venue origin as reference). An advantage of the coordinate conversion is that the scan analyzer 116 can process the fingerprint data from different map tiles the same way, and does not need to know from which tile the fingerprint data came from.

In some implementations, scan analyzer 116 can designate the highest probable location as a location observation, and provide the location observation to particle filter engine 118. Particle filter engine 118 is a component of mobile device 106 configured to use available data to estimate a current location of mobile device 106. Particle filter engine 118 can determine an initial location of mobile device 106, for example, by using random location in the venue or using a first observation. In addition, particle filter engine 118 can receive from sensors 114 motion information of mobile device 106. Using the motion information and a map of the venue, particle filter engine 118 can configure parameters of a particle filter to model candidate locations of mobile device 106. Particle filter engine 118 can then update the particle filter using the location observation from scan analyzer 116. Updating the particle filter can include determining a current location estimate based on a past location estimate and the observation. The current location estimate can be determined using a probability density function on the candidate locations. Particle filter engine 118 can provide a representation of current location estimate as an output for display to a user of mobile device 106.

Generating Location Fingerprint Data

Figure 5:
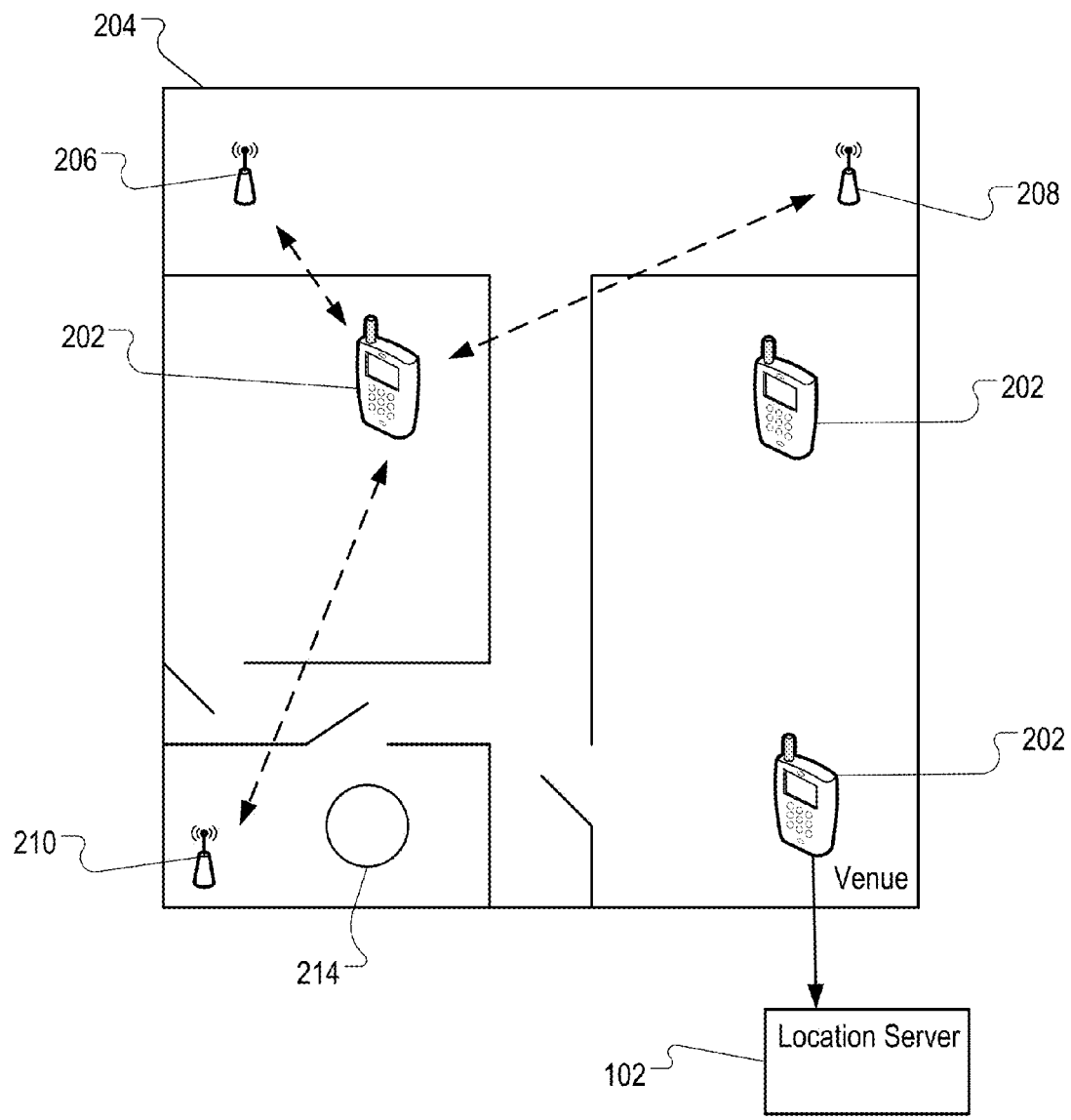
FIG. 5 illustrates exemplary survey techniques for generating location fingerprint data.

FIG. 5 illustrates exemplary survey techniques for generating location fingerprint data. Sampling device 202 can survey available features of venue 204. Surveying venue 204 can include measuring one or more environment variables using a sensor of sampling device 202. Each environment variable can be a radio signal characteristic, a magnetic field intensity or direction, a temperature, a sound level, a light intensity or color. The environment variables can include signals from signal sources 206, 208, and 210. Signal sources 206, 208, and 210 can transmit signals that are detectable by sampling device 202 inside of venue 204. Signal sources 206, 208, and 210 need not be physically located in venue 204.

Sampling device 202 can be carried to various sampling points in venue 204. Sampling device 202 can determine the sampling point based on a user input on a map of venue 204 displayed on sampling device 202. At each sampling point, sampling device 202 can record a sensor reading measuring signals from one or more signal sources. For example, if signal sources 206, 208, and 210 are wireless access points, sampling device 202 can record SSID received from the access points, and record RSSI from each wireless access point when sampling device 202 can detect a wireless signal from each wireless access point (as indicated in dashed lines in FIG. 2). Sampling device 202 can designate the measurement at each sampling point as a measurement vector of the sampling point. At each sampling point, sampling device 202 need not detect signals from all signal sources to generate the measurement vector for a sampling point. Sampling device 202 can send the measurement vectors to location server 102 as survey data for additional processing.

Venue 204 may be divided into several regions that are associated with different map tiles. When sampling device is carried to a first region associated with a first map tile, the sensor readings are stored in a first file associated with the first map tile. When sampling device is carried to a second region associated with a second map tile, the sensor readings are stored in a second file associated with the second map tile, and so forth. The locations of the sampling points may be represented using local coordinates that use a local reference point within the map tile.

Venue 204 may include space 214 for which no sampling data exist. Space 214 can be a space not reached by sampling device 202, or a space where sampling device 202 moved through without staying long enough to obtain a reading of the signals. Fingerprint engine 108 of location server 102 can determine measurements at space 214 through interpolation or extrapolation. Additional details of operations of fingerprint engine 108 will be described below in reference to FIG. 3.

Figure 6:
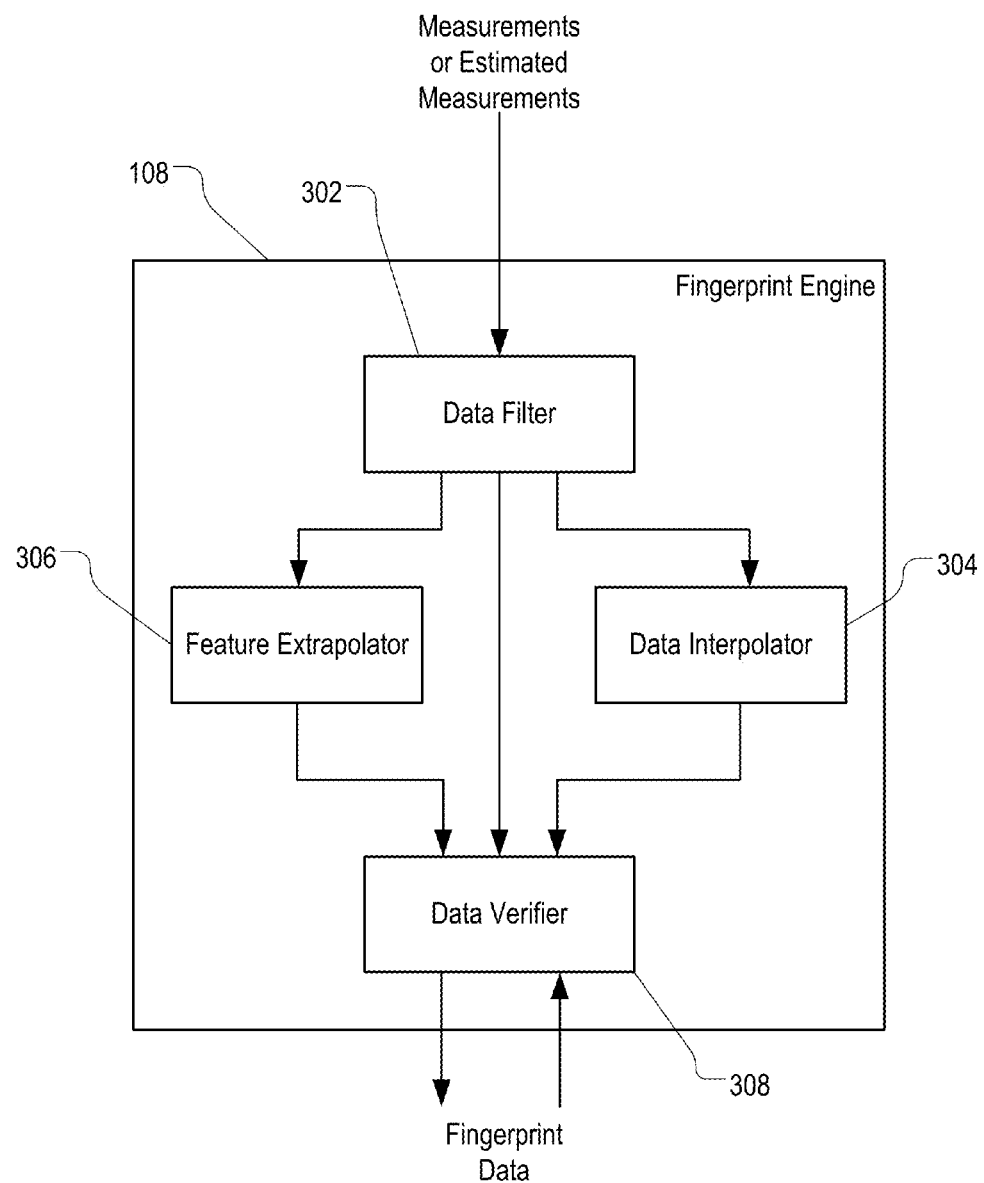
FIG. 6 is a block diagram of an exemplary fingerprint engine for generating location fingerprint data.

FIG. 6 is a block diagram of exemplary fingerprint engine 108 for generating location fingerprint data. Fingerprint engine 108 can be programmed to receive survey data from one or more individual sampling devices (e.g., sampling device 202 of FIG. 2) and generate the location fingerprint data based on the received survey data. Fingerprint engine 108 can include data filter 302. Data filter 302 is a component of fingerprint engine 108 configured to pre-process the received survey data. Pre-processing the survey data can include discarding abnormal survey data (e.g., incomplete readings or outliers) and compensating for differences among different sampling devices.

Fingerprint engine 108 can include data interpolator 304. Data interpolator 304 is a component of fingerprint engine 108 configured to up-sample a feature resolution. Data interpolator 304 can determine that the survey data are sparse, and apply an interpolation scheme in the up-sampling.

Fingerprint engine 108 can include feature extrapolator 306. Feature extrapolator 306 is a component of fingerprint engine 108 configured to determine whether a confidence value of a specific feature satisfies a threshold and to extrapolate a feature from survey data if the threshold is satisfied. The feature can reflect a characteristic of signals received at a given sampling point.

Fingerprint engine 108 can include data verifier 308. Data verifier 308 is a component of fingerprint engine 108 configured to maintain integrity of the features by verifying a feature derived from survey data against one or more existing features stored in location fingerprint database 104. Data verifier 308 can verify that each feature at a given venue that has a given set of constraints can yield at least one matching result at a high degree of confidence. Data verifier 308 can facilitate maintaining location fingerprint database 104, including keeping location fingerprint database 104 up to date. In addition, data verifier 308 can evaluate integrity of location fingerprint database 104 by determining uniqueness of location fingerprint database 104 as a function of spatial difference.

Figure 7A:
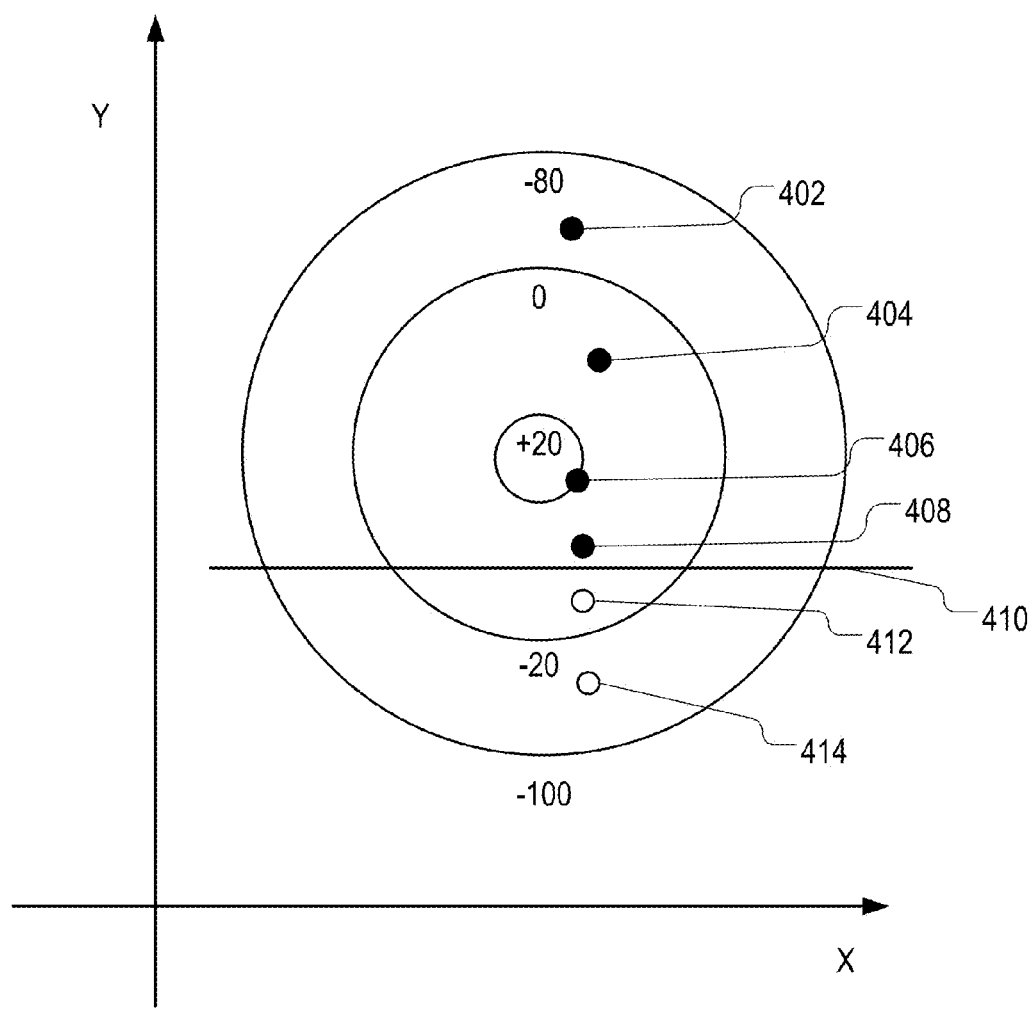
FIG. 7A illustrates exemplary interpolation and extrapolation techniques used in surveying a venue.

FIG. 7A illustrates exemplary interpolation and extrapolation techniques used in surveying a venue. The interpolation and extrapolation can be performed by data interpolator 304 and feature extrapolator 306 as described above in reference to FIG. 6, respectively. For convenience, the techniques will be described in reference to two exemplary surveys.

In a first survey, data interpolator 304 can receive survey data from a sampling device (e.g., sampling device 202 of FIG. 5). The survey data can include measurement of one or more environment variables in a venue. For example, the survey data can include one or more measurements of RSSI of an RF signal received by the sampling device from a wireless access point when the sampling device moved inside of a building having one or more interior walls. Data interpolator 304 may or may not have information on the physical location of the wireless access point. The measurements of RSSI can be associated with locations 402 and 406. Data interpolator 304 may not have received RSSI measurements at location 404 or 408. Locations 402 and 406 can be provided by a surveyor, e.g., a user carrying the sampling device while walking in the venue. Data interpolator 304 can up-sample the received survey data and determine expected RSSI at locations 404 and 408 based on signal propagation properties of RF signals transmitted by the wireless access point.

Feature extrapolator 306 can receive a map (or other structural information) of the venue. Based on the map, feature extrapolator 306 can determine that wall 410 lies on the rectilinear path ahead of location 408. The map may include a wall type of wall 410, e.g., whether wall 410 is a thin glass screen or a thick weight-bearing wall. Feature extrapolator 306 may not have RSSI data for location 412 or 414. Based on historical data and the wall type, feature extrapolator 306 can determine, for example, wall 410 can attenuate a signal from a wireless access point by 20 dB. Accordingly, feature extrapolator 306 can determine that an expected RSSI at location 412 is −20 dB, and an expected RSSI at location 414 is −100 dB.

Figure 7B:
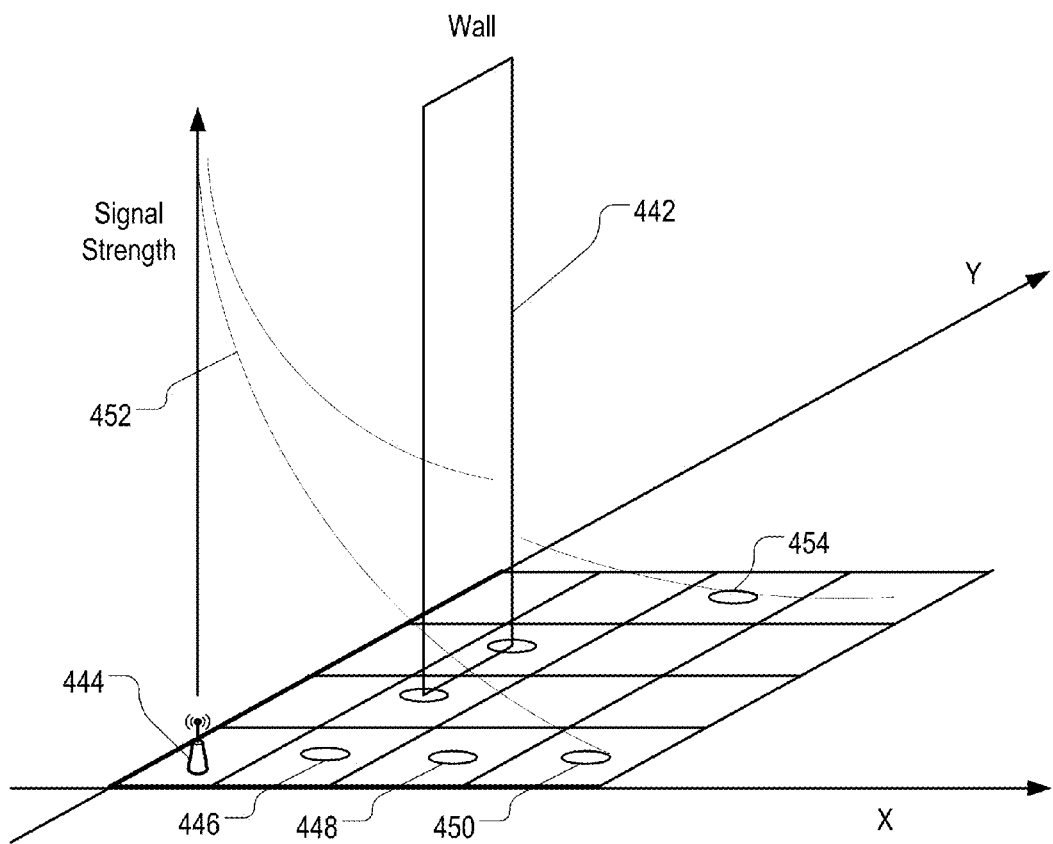
FIG. 7B illustrates exemplary techniques for generating location fingerprint data based on prediction.

FIG. 7B illustrates exemplary techniques for generating location fingerprint data based on prediction. In some implementations, location server 102 may not have survey data for a venue. Location server 102 can use a map of the venue, and locations and types of signal sources in the venue to generate predicted measurements of environment variables in place of survey data. Specifically, signal estimator 110 of location server 102 can generate predicted signal measurements for one or more sampling points based on the map and the locations and types of the signal sources.

For example, signal estimator 110 can receive a map of a building that indicates wall 442 is located in the building. The map may also include information on a type of wall 442. In addition, signal estimator 110 can receive information on signal source 444, which can be a wireless access point. Signal source 444 may be located inside or outside of the building. Signal estimator 110 can determine, based on a relative location of the building and signal source 444, signal from signal source 444 can be detected in the building. Accordingly, signal estimator 110 can determine that signal source 444 can be used to determine location fingerprint data to be associated with the building. Signal estimator 110 can then calculate an expected signal measurement, e.g., an expected RSSI, for signal source 444 at sampling points (e.g., sampling points 446, 448, and 450). The calculation can be based on a characteristic of signal source 444 (e.g., a transmission power of a wireless access point), signal attenuation pattern 452 of signal source 444, and a distance between each sampling point and the signal source. Signal attenuation pattern 452 may be different for different types of signal sources. For example, an attenuation pattern for a signal from a wireless access point may be different from an attenuation pattern for a signal from a light source, a magnetic field source, a sound source, or a heat source.

When signal estimator 110 calculates expected signal readings, signal estimator 110 can adjust a value of signal reading expected based on an attenuation pattern based on structures of the building as indicated in a map. For example, signal estimator 110 can determine that, based on a location of wall 442 in the building and a type of wall 442, signals received by a mobile device at location 454, which is located behind wall 442 from signal source 444. Accordingly, signal estimator 110 can further attenuate the expected value of signal reading by a constant (e.g., 20 dB) or a function for location 454.

Signal estimator 110 can determine sampling points 446, 448, and 450 based on the map and the location of signal source 444. Signal estimator 110 can select points from pedestrian accessible space (e.g., not inside of walls or columns) where a mobile device may receive signal from signal source 444 loud and clear such that a feature match, if exists, can have a high confidence value.

Figure 8:
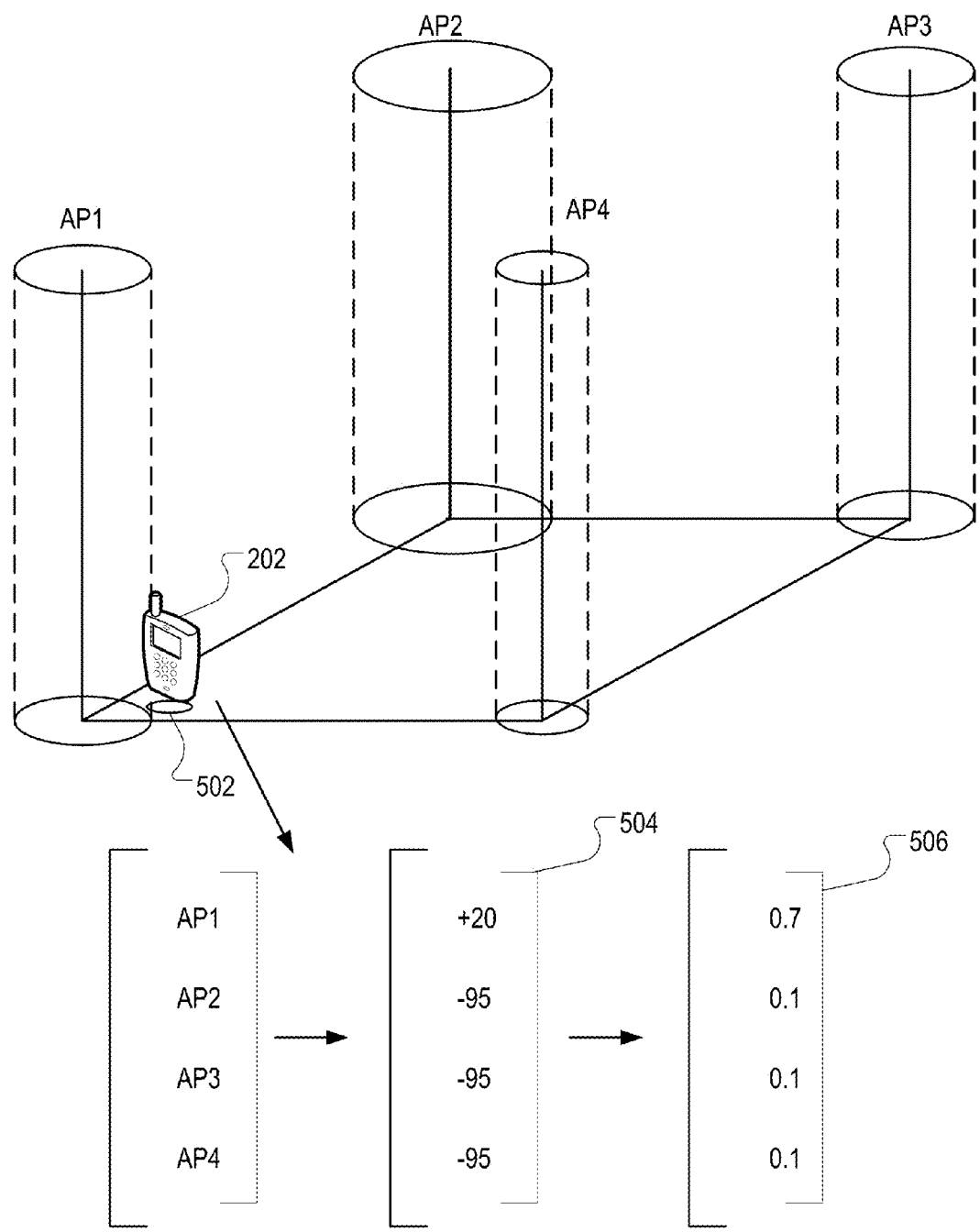
FIG. 8 illustrates an exemplary feature vector in location fingerprint data.

FIG. 8 illustrates an exemplary feature vector in location fingerprint data. Sampling device 202 can conduct a survey in a venue. Sampling device 202 can detect four signal sources when sampling device 202 is inside of the venue. Each of the four signal sources can be a wireless access point. Each of the four signal sources can have an identifier, e.g., a media access control (MAC) address. The identifiers can be, for example, AP1, AP2, AP3, and AP4, respectively. A height of each vertical line in FIG. 5 represents a measured signal strength. In this example, the vertical lines have equal height, and each corresponds to a circle. Each circle around a signal source represents a measurement (e.g., RSSI) of the corresponding signal source that is equal to a measurement represented (e.g., 20 dB) by the height of the vertical line. A circle (e.g., the one around AP2) can be larger than another one (e.g., the one around AP4). The different in size can indicate that sampling device 202 can receive signals having a same signal strength in a larger area around one signal source (AP2) than around another signal source (AP4).

At location 502, sampling device 202 can detect signals from AP1, AP2, AP3, and AP4. The signal strength of the signals from AP1, AP2, AP3, and AP4 can be +20 dB, −95 dB, −95 dB, and −95 dB, respectively. Sampling device 202 can submit the signal strengths as measurement vector 504 to location server 102. Location server 102 can determine feature vector 506 based on measurement vector 504. Feature vector 506 can have multiple elements, each element corresponding to a signal source. A value of each element can indicate a probability that the corresponding signal source is detectable by a mobile device. Feature vector 506 can be derived from measurement vector 504. Feature vector 506 can indicate that some measurements may bear more information than other measurements. For example, if at a given location, four access points AP1, AP2, AP3, and AP4 are detected, whereas signals from one access point (AP1) is very strong compared to signals from the other three access points, Location server 102 can determine that a strong RSSI measurement can only be observed in a spatially limited region, and accordingly, strong access point AP1 can have higher information content (entropy) than AP2, AP3, and AP4. For example, location server 102 can assign entropy values 0.7, 0.1, 0.1, and 0.1 to AP1 through AP4, respectively. Feature vector 506 can be associated with location 502, indicating that, at location 502, a mobile device is likely to detect a signal from AP1, but unlikely to detect signals from AP2, AP3, and AP4. Location server 102 can store feature vector 506 in a location fingerprint database as a portion of the location fingerprint data associated with the venue surveyed by sampling device 202.

In some implementations, location server 102 can designate a feature vector as a good feature vector when a measurement pattern indicates a high probability that sampling device 202 is located proximate to a given signal source. Location server 102 can designate a feature vector as a good feature vector based on factors including observed power level or existence of a given frequency, among other factors. In the example shown, when location server 102 receives measurement vector 504, location server 102 can determine sampling device 202 has a high likelihood of being close to AP1, if an area around AP1 where a device can measure an RSSI of 20 dB is small. Accordingly, location server 102 can designate feature vector 506 as a good feature vector. A good feature vector can be associated with higher weight in location determination by a mobile device.

Exemplary Location Fingerprint Data

Figure 9:
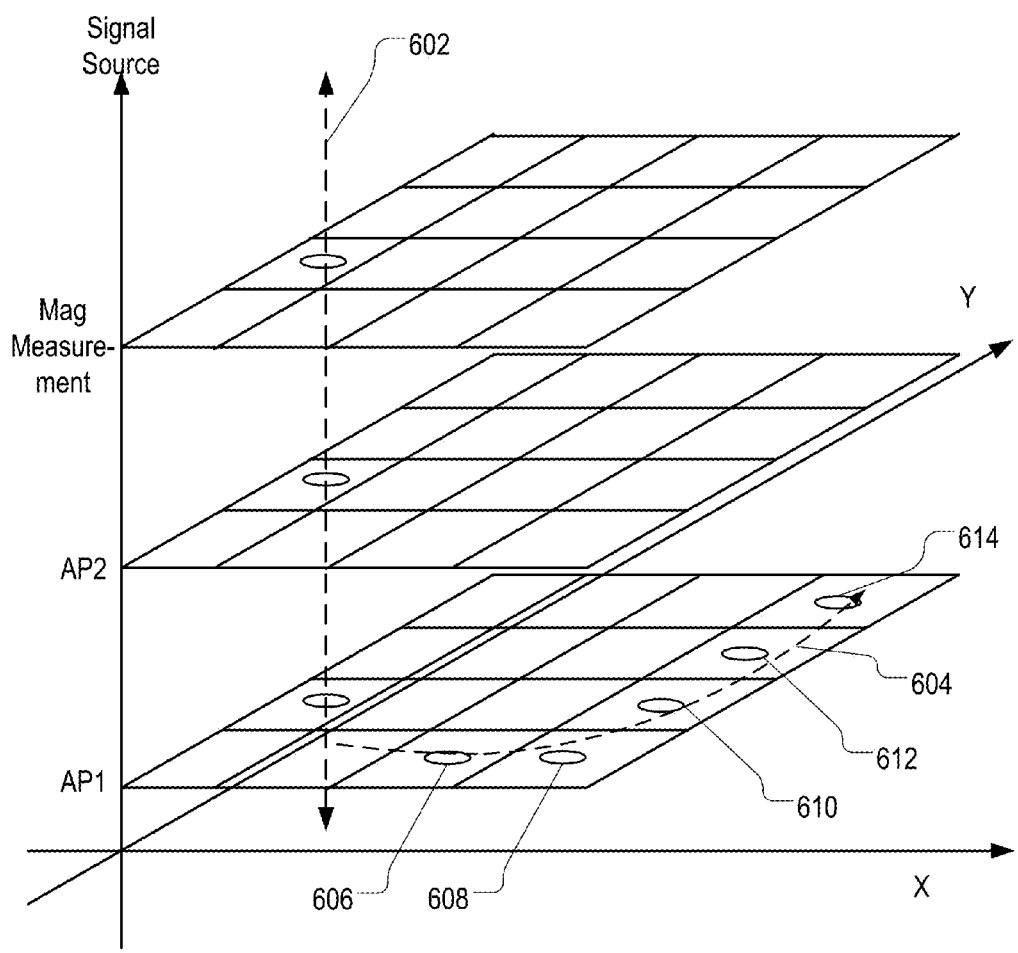
FIG. 9 illustrates an exemplary logical structure of a location fingerprint database.

FIG. 9 illustrates an exemplary logical structure of a location fingerprint database. Location fingerprint data can include, for each location among multiple locations in a venue, at least one of measurements (or lack of measurements thereof) of various signal sources, expected measurements of the signal sources, variance of the expect measurements, and a feature vector. For example, location fingerprint data can include at least one of: wireless access point fingerprint data; RFID fingerprint data; NFC fingerprint data; Bluetooth™ fingerprint data; magnetic field fingerprint data; cellular fingerprint data; or computer vision fingerprint data. The various fingerprint data can be aggregated to form the location fingerprint data for a given location.

Location fingerprint data can be stored as multi-dimensional data in association with a venue. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations (e.g., locations 606, 608 610, 612, and 614) distributed in the venue. The distribution can be even and uniform, or concentrated around areas where good feature vectors exist.

At least one dimension of the multi-dimensional data can be a signal source dimension. Feature vector 602 can correspond to a location represented by (X, Y, Z), and have one or more values of each signal source. The values can include one or more of an expected value of an environment variable (e.g., an expected RSSI), a variance of the expected value, or a probability that a mobile device can detect the signal from the signal source. Fingerprint engine 108 of location server 102 can determine the expected value and variance based on measurements and variance of the measurements received from a sampling device (e.g., sampling device 202 of FIG. 5). The measurements can be diverse. For example, the signal source dimension can include dimension variables Ap1, AP2, and a magnetic field measurement.

In some implementations, the space dimensions can be normalized. Fingerprint engine 108 can receive measurements from one or more sampling devices. Each measurement can correspond to a sampling point. For example, a surveyor can carry the sample device and follow path 604 to survey a venue. Fingerprint engine 108 can normalize path 604 to locations 606, 608 610, 612, and 614 according to distribution of 606, 608 610, 612, and 614.

Exemplary Location Estimate

Figure 10:
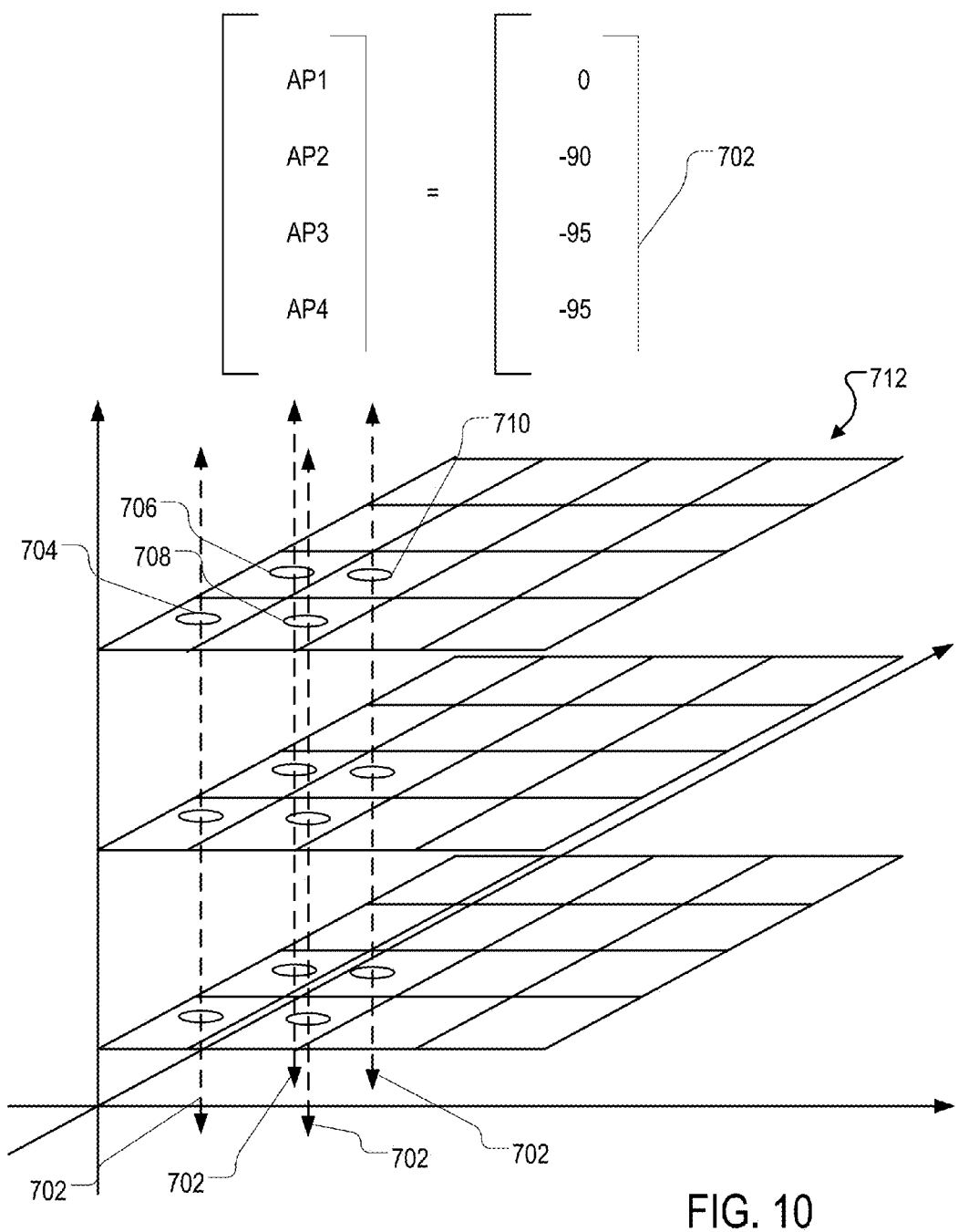
FIG. 10 illustrates exemplary techniques of estimating a current location using statistical classification.

FIG. 10 illustrates exemplary techniques of estimating a current location using statistical classification. Mobile device 106 (of FIG. 4) can receive a map tile having location fingerprint data 712 from location server 102. Location fingerprint data 712 can be associated with a region within a venue. Location fingerprint data 712 can include all data in a location fingerprint database specific for the region within the venue. Mobile device 106 can match multi-dimensional measurement vector 702 derived from one or more sensors 114 against location fingerprint data 712 to derive a highest probable location of mobile device 106 at the venue. The highest probable location can be a function of multi-dimensional measurement vector 702.

Scan analyzer 116 of mobile device 106 can determine the highest probable location of mobile device 106 using an adaptive scheme between statistical classification and regression. In the statistical classification, scan analyzer 116 can identify to which locations in a set of locations (e.g., locations 704, 706, 708, or 710 of the venue) a vector of sensor measurements belong based on training data. The set of locations can be estimated locations of mobile device 106. The vector of sensor measurements can include multi-dimensional measurement vector 702. The training data can include measurements associated with known locations. Scan analyzer 116 can use location fingerprint data 712 as the training data.

Scan analyzer 116 of mobile device 106 can employ a point-wise kernel estimation procedure to determine a category of multi-dimensional measurement vector 702. The category can be location 704, 706, 708, or 710. Scan analyzer 116 can determine a probability density function (PDF) of a location of mobile device 106 among locations 704, 706, 708, and 710. To determine the PDF, scan analyzer 116 can determine a probability that multi-dimensional measurement vector 702 is located at each of locations 704, 706, 708, and 710 by applying a kernel function to a difference between multi-dimensional measurement vector 702 and respective feature vectors or measurement vectors corresponding to locations 704, 706, 708, and 710. Scan analyzer 116 can apply a symmetric function that integrates to one (e.g., a Gaussian function, uniform function, or cosine function) as a choice of the kernel function for the point-wise kernel estimation.

Scan analyzer 116 can employ the feature vector in the kernel estimation procedure. In some implementations, the feature vector can use a derived entropy vector. Scan analyzer 116 can use the feature vector to increase significance of an access point the signals from which measure strong. The entropy vector can include as elements entropy of each subset of the locations. Scan analyzer 116 can use the entropy vector to express information content of multi-dimensional measurement vector 702.

Scan analyzer 116 can determine that a subset of multi-dimensional measurement vector 702 having lower readings (e.g., lower RSSI measurements) possesses a lower information content than a subset of multi-dimensional measurement vector 702 having higher readings (e.g., higher RSSI measurements) possesses. The determination can indicate that, for a venue, a subset of regions having low readings can be greater than a subset of regions having higher readings.

In some implementations, scan analyzer 116 can optimize the determination by reducing a search space. A search space can correspond to a location of a mobile device and an uncertainty associated with the location. Scan analyzer 116 can start from an initial estimate, which can be designated as an initial search space. For example, when scan analyzer 116 has no information on location of mobile device 106, scan analyzer can designate the world as the initial search space. When scan analyzer 116 obtains some location information, scan analyzer 116 can reduce the search space to the United States, the state of California, the city of Cupertino, or a particular street block or building, based on the location information. Each location estimate can be derived from the estimate before.

Reducing the search space can include reducing, when possible, a number of discrete points (e.g., locations) for calculating probabilities in the PDF. Scan analyzer 116 can execute the kernel function in an a priori domain provided to scan analyzer 116. The a priori domain can be an a posteriori state estimate at time k given observations up to and including at time k by particle filter engine 118. For example, particle filter engine 118 can determine that, based on a constraint of the venue (e.g., a wall) and a limit of a speed of movement of mobile device 106 (to a maximum speed of a human walking or running), location 710 is not a possible location and shall be filtered out.

Scan analyzer 116 can then determine a location observation based on probability densities on locations 704, 706, and 708. The a priori domain can be associated with uncertainty, which may increase or decrease. For example, in an attempt to reduce the search space, mobile device 106 can lose signals, causing location uncertainty and search space to increase.

Figure 11:
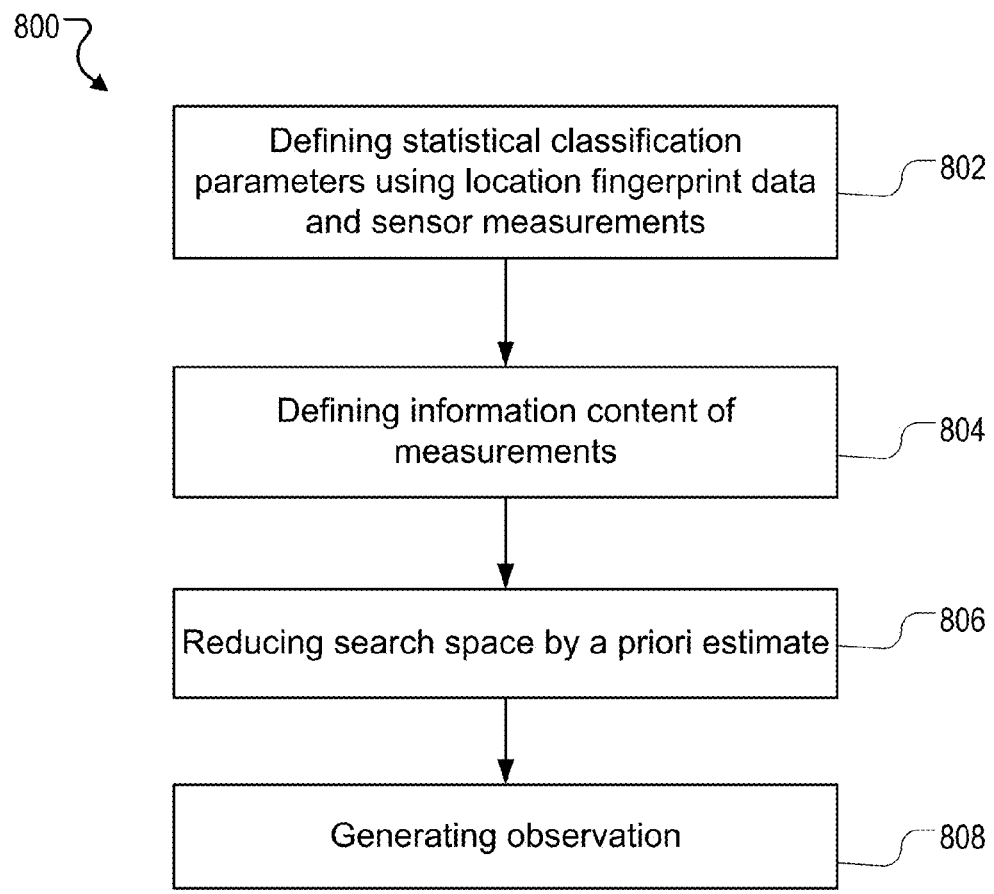
FIG. 11 is a flowchart of an exemplary procedure of generating a location observation using kernel estimation.

FIG. 11 is a flowchart of exemplary procedure 800 of generating a location observation using kernel estimation. Procedure 800 can be performed by exemplary scan analyzer 116 as described above in reference to FIG. 1.

Scan analyzer 116 can define (802) statistical classification parameters using location fingerprint data and sensor measurements. Scan analyzer 116 can define classification categories, a sample vector, and training data for the statistical classification. The classification categories can be one or more candidate locations of mobile device 106. The candidate locations can be one or more locations in a location fingerprint database. The sample vector can be multi-dimensional measurement vector 702 received from one or more sensors. The training data can be vectors stored in the location fingerprint database. Scan analyzer 116 can map the sample vector into the location categories (or "bins"). The mapping can be classification or regression. Classification can include a strict association where the sample vector is mapped into exactly one bin. Regression can include a derived association, where the sample vector is mapped into multiple bins. In regression, scan analyzer 116 can derive a final category of the sample vector by performing statistical analysis on the multiple bins.

Scan analyzer 116 can define (804) information content of measurements. Defining information content of measurements can include determining a weight of each measurement in the multi-dimensional measurement vector by applying a feature vector (e.g., an entropy vector).

Scan analyzer 116 can reduce (806) search space by a priori estimate. Reducing the search space can include executing a kernel function over an a priori domain, which can be an a posteriori state estimate provided to scan analyzer 116 by particle filter engine 118.

Scan analyzer 116 can generate (808) a location observation. Generating the location observation can include performing a point-wise kernel estimation procedure to estimate of a PDF of location of mobile device 106 in the reduced search space. Generating the location observation can include aggregating statistics out of a set of most likely matches according to the PDF. Scan analyzer 116 can provide the location observation to particle filter engine 118 for estimating a current location of mobile device 106.

Exemplary Particle Filter

Figure 12:
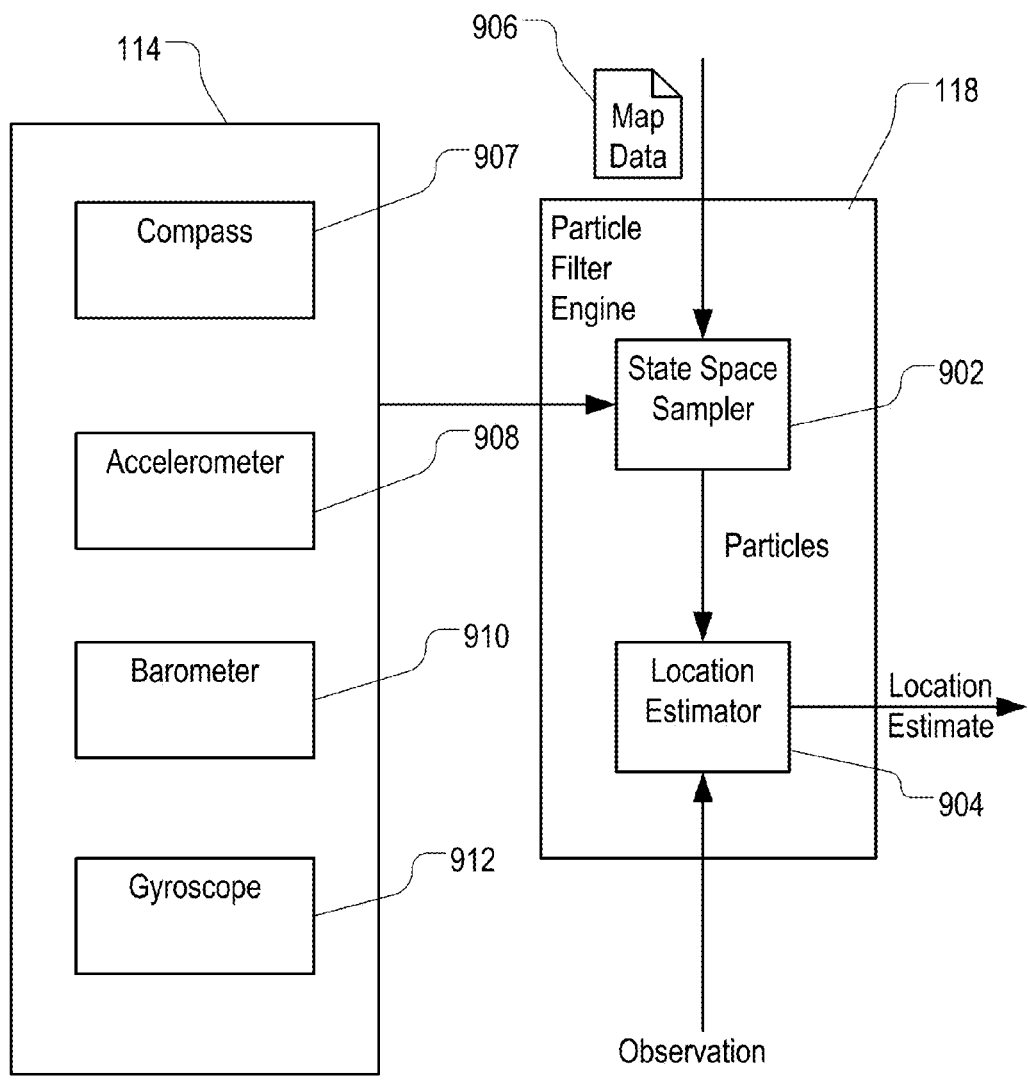
FIG. 12 is a block diagram illustrating an exemplary mobile device estimating a current location using a particle filter.

FIG. 12 is a block diagram illustrating an exemplary mobile device estimating a current location using a particle filter. The mobile device can be mobile device 106 as described in reference to FIG. 4.

Mobile device 106 can use "available information" to estimate a location when GPS signals are unavailable. The available information can include, for example, motion models, motion measurements, environmental constraints, and map constraints. Mobile device 106 can then use a state space model to fuse available information from different information sources.

The state space model can be a simulation-based estimation model, e.g., a particle filter. Particle filter engine 118 of mobile device 106 can estimate a probability density of current locations $X_k$ of mobile device 106 using the particle filter based on a previous location $X_{k-1}$ conditioned upon a current observation $Z_k$, where k is a given point in time, k−1 is a point prior to k in time. The time length between k and k−1 can be configurable (e.g., one second or five seconds).

Particle filter engine 118 can include state space estimator 902. State space estimator 902 can be configured to receive available information and fold the available information into location estimator 904, which is a component of particle filter engine 118 configured to provide a location estimate.

State space estimator 902 can receive, from a storage device of a server or of mobile device 106, map data 906. Map data 906 can include attributes of one or more constraints in a venue that includes a space accessible by a pedestrian carrying mobile device 106. The constraints can include structural constraints (e.g., walls). State space estimator 902 can determine that the pedestrian cannot transition through the structural constraint. State space estimator 902 can determine a likelihood where the pedestrian may move within a given time interval, given limited motion speed of the pedestrian.

The constraints in map data 906 can include attributes of regions in the space of the venue. For example, the constraints in map data 906 can define a pathway (e.g., a hallway) and an open area (e.g., a lobby, a cafeteria, or an office). State space estimator 902 can determine that, when a pedestrian walks in the pathway, the pedestrian is likely to adhere to the pathway, whereas when the pedestrian walks in the open area, the pedestrian can float, e.g., move in random directions, without adhering to a pathway. State space estimator 902 can determine that the movement of the pedestrian is subject to constraint probabilities. For example, state space estimator 902 can determine a probability that the pedestrian enters an open space that opens to a pathway when a pedestrian is walking along a pathway. The probability that the pedestrian enters the open space can be higher or lower than a probability that the pedestrian stays on the pathway, based on a type of the open space (e.g., whether the open space is a lobby, a cafeteria, or an office) or a relative position of the pathway and the open space (e.g., whether the pathway ends at the open space). Additional details on determining limits on likelihood of where the pedestrian may move within a given time interval will be described below in reference to FIG. 13.

State space estimator 902 can receive, from sensors 114, a motion context. The motion context can include readings of sensors 114. Sensors 114 can include micro-electromechanical systems (MEMS) of mobile device 106. For example, sensors 114 can include compass 907 configured to determine a direction of a pedestrian's heading, accelerometer 908 configured to determine whether a pedestrian's movement is walking or running, a pace of the movement, and a stride of the movement. Sensors 114 can include barometer 910 configured to determine whether a pedestrian is moving upwards or downwards (e.g., in an elevator or on stairs) based on air pressure. Sensors 114 can include gyroscope 912 configured to determine whether a pedestrian is turning.

Based on the motion context, state space estimator 902 can determine if a pedestrian carrying mobile device 106 is stationary or non-stationary. If state space estimator 902 determines that the pedestrian is stationary, state space estimator 902 can configure location estimator 904 using state space system noise (e.g., random locations). If state space estimator 902 determines that the pedestrian is non-stationary, state space estimator 902 can configure location estimator 904 using motion speed of the pedestrian to drive state space update of location estimator 904.

State space estimator 902 can determine attitude information based on the motion context data received from sensor 114. The attitude information can include a heading of the pedestrian determined using a series of motion context data received from sensor 114. State space estimator 902 can receive the series of motion context data over time, and estimate a heading based on the series of motion context data using a filter configured to use a series of measurements observed over time to produce estimates of unknown variables. In some implementations, the filter can be a Kalman filter.

Based on the map constraints, the motion context, and the attitude information, state space estimator 902 can determine candidate locations of mobile device 106. State space estimator 902 can designate the candidate locations as samples (or "particles") for propagation in particle filter $P(X_k|X_{k-1})$, where $X_k$ are current locations of mobile device 106 at time k, $X_{k-1}$ are previous locations at time k−1. Propagating the particle filter can include applying the available information, including map data, motion context, and attitude information to the particle filter to determine probability density of the candidate locations in at least a portion of the venue, given previous locations. Propagating the particle filter can be based on a stochastic process for explore some or all potential constraints. In some implementations, the stochastic process can be a discretized Wiener process. Propagating the particle filter can be subject to a multi-dimensional correlation function based on availability of the constraints.

State space estimator 902 can detect particle depletion when a number of candidate locations fall below a threshold number sufficient for probability density calculation. Upon such detection, state space estimator 902 can perform a parallel resampling of a portion of the venue or the entire venue to recover from filter divergence.

Upon propagating the particle filter, state space estimator 902 can provide the particle filter to location estimator 904 for update. Location estimator 904 can update the particle filter using a location observation received from a scan analyzer (e.g., scan analyzer 116 as described in reference to FIG. 4). Updating the particle filter can include feeding estimated fingerprint location into the particle filter. The location observation can be subject to a measurement model having a given system uncertainty. Updating the particle filter can include calculating probability density $P(X_k|X_{k-1}, Z_k)$ where $Z_k$ is a location observation at time k. Location estimator 904 can then determine a current location of mobile device 106 (location at time k) using the probability density, including designating a most likely location of mobile device 106 as the current location of mobile device 106.

Figure 13:
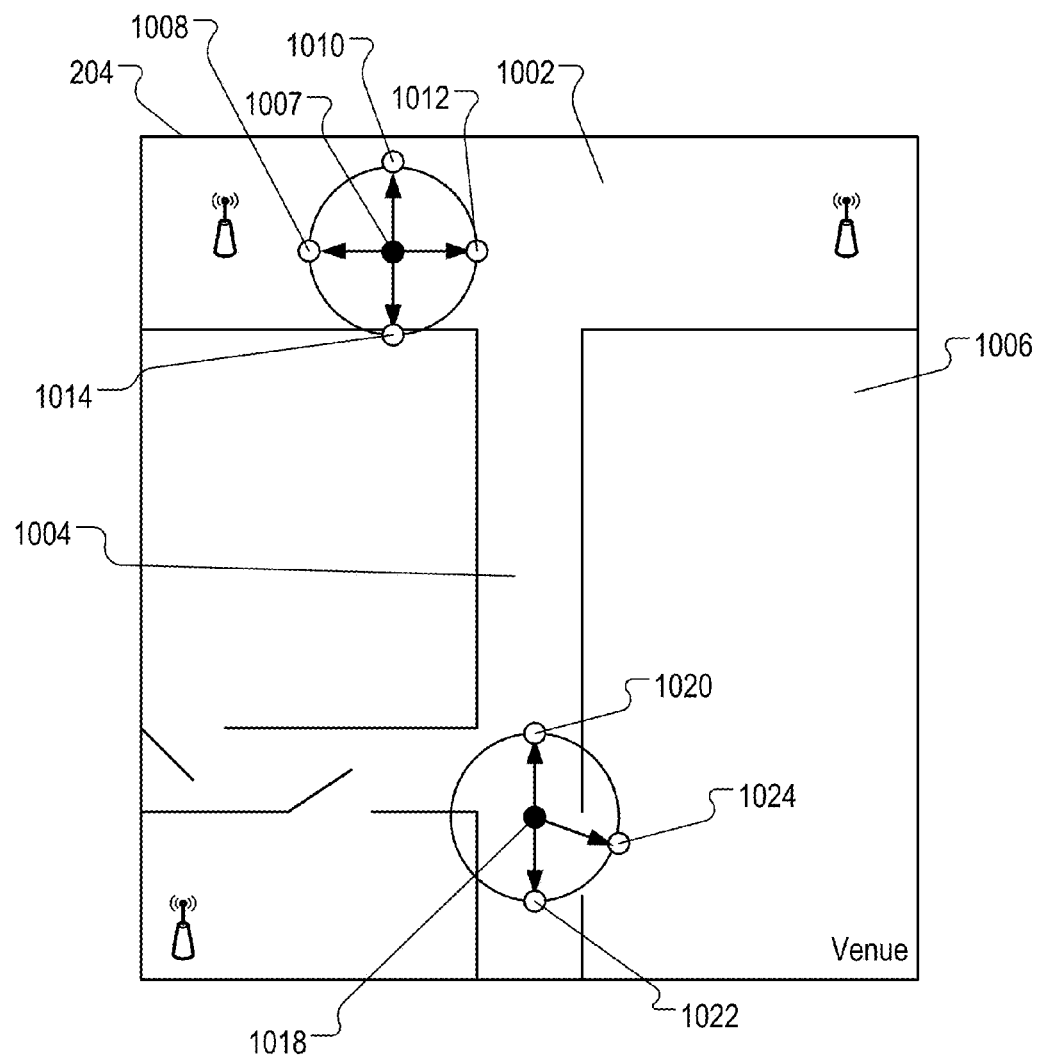
FIG. 13 illustrates exemplary application of constraints to a particle filter.

FIG. 13 illustrates exemplary application of constraints to a particle filter. A state space sampler (e.g., state space estimator 902 as described above in reference to FIG. 12) can receive map data of venue 204. The map data can specify that venue 204 includes open space 1002, hallway 1004, and office 1006.

For a given time k, mobile device 106 can determine initial location 1007 corresponding to time k−1. The initial location can be a previously estimated location of mobile device 106. Immediately after mobile device 106 entered venue 204, or immediately after mobile device 106 is turned on at venue 204, it is possible that mobile device 106 has not performed a previous location estimate. In such cases, mobile device 106 can determine that initial location 1007 is a random location in venue 204. Initial location 1007 is illustrated as a single point. In some implementations, initial location 1007 can be a probability density function on multiple possible locations, each possible location being associated with a probability that mobile device 106 is located at that location. The probability density function can be discrete or continuous.

Mobile device 106 can determine, using one or more sensors, that mobile device 106 is stationary, e.g., when linear and angular speed and linear and angular acceleration are zero or near zero (e.g., undistinguishable from system error margin). Upon determining that mobile device 106 is stationary, mobile device 106 can generate candidate locations 1008, 1010, 1012, and 1014 for time k for a particle filter. Candidate locations 1008, 1010, 1012, and 1014 can be generated based on state space system noise. In addition, initial location 1007 can be a candidate location. Mobile device 106 can apply constraints of movement in venue 204 to the particle filter. For example, mobile device 106 can determine that, since initial location 1007 is in open space 1002, no directional constraint need to be applied; candidate locations 1008, 1010, 1012, and 1014 can be in any direction from initial location 1007. In addition, mobile device 106 can determine that candidate location 1014 represents an impossibility, because mobile device 106 needs to go through a barrier (e.g., a wall) or to travel at a speed exceeding a walking or running speed for a pedestrian to go around hallway 1004 to reach candidate location 1014 from initial location 1007. Mobile device 106 can remove candidate location 1014 from the particle filter based on the impossibility.

At given time t, mobile device 106 can determine initial location 1018 of mobile device 106. Initial location 1018 can correspond to time t−1. Mobile device 106 can determine, using one or more sensors, that mobile device 106 is non-stationary, e.g., when linear or angular speed or acceleration is nonzero. Upon determining that mobile device 106 is non-stationary, mobile device 106 can generate candidate locations for time t for a particle filter. The candidate locations can include location distribution sampled by the particle filter. Mobile device 106 can decide that initial location 1018 is on a path in venue 204 following hallway 1004. Accordingly, mobile device 106 can determine that a direction of movement of mobile device 106 is limited to a direction of the path as defined by hallway 1004. Based on a heading of mobile device 106, mobile device 106 can determine candidate location 1020, which is in front of mobile device 106 according to the heading, and candidate location 1022, which can be behind mobile device 106 according to the heading. Mobile device 106 can determine that candidate location 1020 is a more likely location of mobile device 106 than candidate location 1022 is. In addition, mobile device 106 can determine that initial location 1018 is sufficiently close to an entrance of office 1006 such that a pedestrian, moving at walking speed, can enter office 1006 during the time between t−1 and t. Accordingly, mobile device 106 can place candidate location 1024 in office 1006. Mobile device 106 can assign a distinct weight to each of the candidate locations 1020, 1022, and 1024 for the particle filter.

Figure 14A:
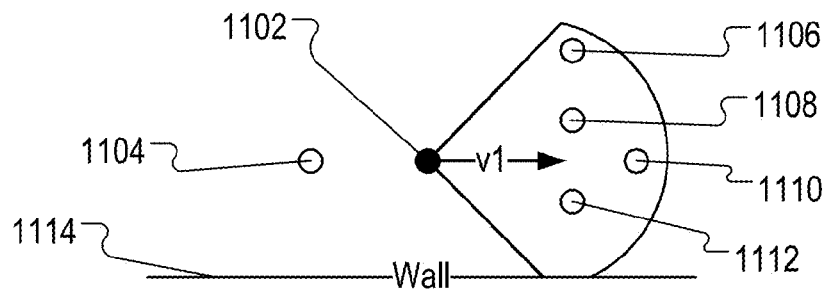
FIGS. 14A-14C illustrate exemplary techniques of configuring a particle filter using readings from sensors of a mobile device.
Figure 14B:
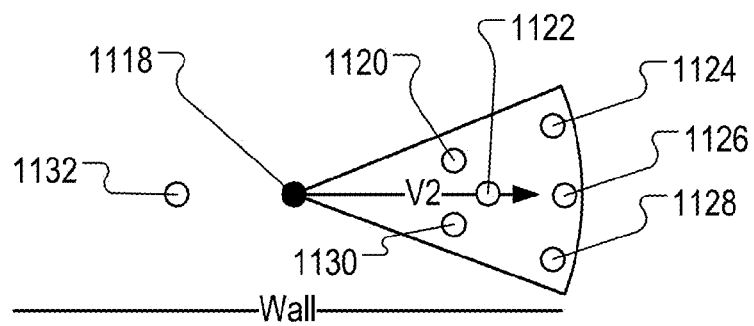
Figure 14C:
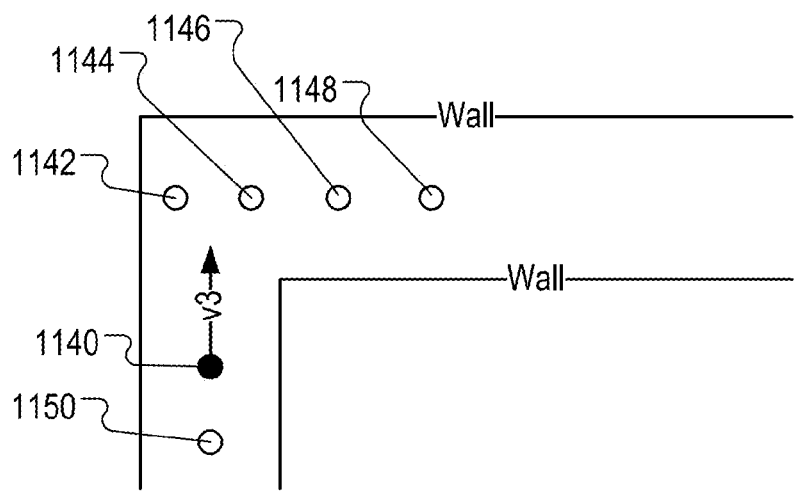

FIGS. 14A-14C illustrate exemplary techniques of configuring a particle filter using readings from sensors of a mobile device. The mobile device can be mobile device 106 as described above in reference to FIG. 4.

FIG. 14A illustrates determining current location estimates based on initial location 1102 when the mobile device is moving at velocity v1. The mobile device can determine the velocity v1 based on rate of change of readings of a sensor. In some implementations, the mobile device can determine the velocity v1 based on a frequency of change of acceleration measured by an accelerometer, where a higher frequency indicates a faster pace of a pedestrian. In addition, the mobile device can determine the velocity v1 based on a magnitude of the acceleration, where a greater magnitude indicates a larger stride.

The mobile device can determine current location estimates 1104, 1106, 1108, 1110, and 1112. The mobile device can generate more current location estimates (e.g., location estimates 1106, 1108, 1110, and 1112) in a direction of the heading of mobile device than current location estimates (e.g., location estimates 1104) in a direction away from the heading. The difference in number of location estimates can simulate situation where the mobile device has a higher likelihood to continue moving in an original heading than to turn back. The current location estimates can be subject to constraints of a venue, e.g., wall 1114. The mobile device can then configure a particle filter using the estimated locations 1104, 1106, 1108, 1110, and 1112, subject to a location observation provided by a scan analyzer (e.g., scan analyzer 116 of FIG. 1). The observation can be derived from location fingerprint data and can include a single location or discrete or continuous probability densities of multiple locations.

FIG. 14B illustrates determining current location estimates based on initial location 1118 when the mobile device is moving at velocity v2. The mobile device can determine that, based on readings of the sensors, velocity v2 is high (e.g., higher than velocity v1 of FIG. 14A). Upon determining that velocity v2 is high, the mobile device can determine that a pedestrian carrying the device is more likely to continue according to the current heading, and less likely to turn back than the pedestrian of FIG. 14A. Accordingly, the mobile device can generate more current location estimates (e.g., location estimates 1120, 1122, 1124, 1126, 1128, and 1130) in a direction of the heading. The mobile device can generate estimated location 1132 in a direction that is away from the heading, to model the possibility that the pedestrian turns back.

The mobile device can generate location estimates 1122 and 1126 on a path the mobile device is projected to be traveling. The mobile device can use location estimates 1122 and 1126 for calculating probabilities the pedestrian is traveling at different velocities, to verify or correct the current velocity (v2) as determined by the motion sensors.

The mobile device can generate location estimates 1120, 1124, 1128 and 1130 for calculating probabilities that the mobile device changes directions. Comparing to FIG. 14A, the velocity v2 is higher than velocity v1. Accordingly, the distribution of location estimates 1120, 1122, 1124, 1126, 1128, and 1130 can be more concentrated along the heading of the mobile device than location estimates 1106, 1108, 1110, and 1112 are, where in a higher concentration, the location estimates are in a narrower beam along the heading and have less divergence away from the heading. For example, in some implementations, an expected number of location estimates is proportional to the velocity of the mobile device; a variance of directions of the location estimate can be inversely proportional to the velocity.

FIG. 14C illustrates determining current location estimates based on initial location 1140 when the mobile device is moving along a pathway. A mobile device can determine initial location 1140 of the mobile device and a motion velocity v3. Based on map data of a venue, the mobile device can determine that the mobile device is heading in a hallway towards a corner. The mobile device can determine that movement of the mobile device is constrained by walls of the hallway. Accordingly, the mobile device can configure a particle filter using location estimates that are on the pathway, e.g., in the hallway. The mobile device can determine current location estimates 1142, 1144, 1146, and 1148 that are not along the heading of the mobile device, but are locations the mobile device is likely to be if the mobile device continues on the heading and then turns to follow the hallway. The mobile device can place more current location estimates (e.g., current location estimates 1142, 1144, 1146, and 1148) in front of the mobile device in the pathway than current location estimates (e.g., current location estimate 1150) behind the mobile device.

Exemplary Processes

Figure 15:
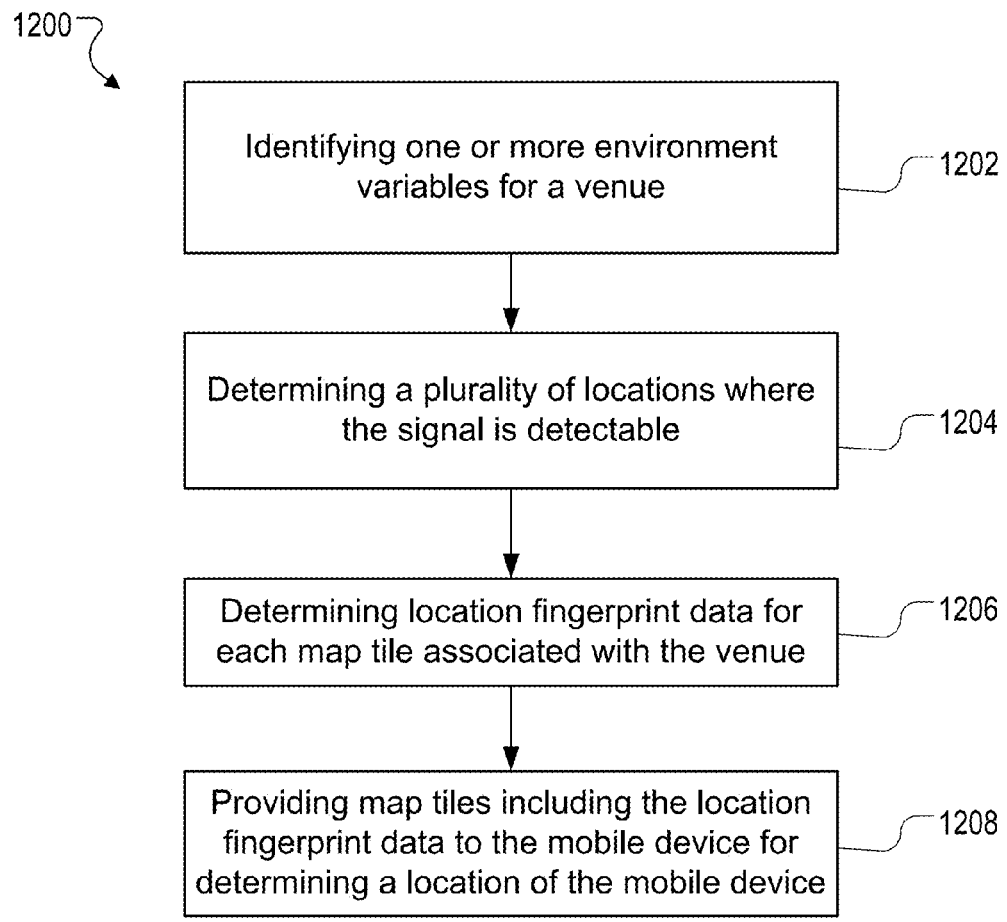
FIG. 15 is a flowchart of an exemplary procedure of generating location fingerprint data.

FIG. 15 is a flowchart an exemplary procedure 1200 of generating location fingerprint data. Procedure 1200 can be performed by a location server, e.g., location server 102 of FIG. 4.

The location server can identify (1202) one or more environment variables to be associated with a venue. Each environment variable can measure a signal. Each environment variable can correspond to a signal source. The signal source can include a wireless access point, a light source, a sound source, a magnetic source, or a heat source. Identifying the one or more environment variables can include receiving an identifier of each signal source from a sampling device (e.g., sampling device 202 of FIG. 2) that is configured to survey the venue.

The location server can determine (1204) multiple locations where the signal is detectable by a sensor of a mobile device when the mobile device is located at the venue. Each location can include location coordinates in a reference frame. For example, when the reference frame is Earth, the location coordinates can include latitude, longitude, and altitude. When the reference frame is the venue, the location coordinates can be vertical and horizontal distances from a given point in the venue.

The location server can determine (1206) location fingerprint data for each map tile associated with the venue. The location fingerprint data can include a fingerprint for each of the locations. The fingerprint can include a set of one or more measurements that the mobile device is expected to receive when the mobile device measures the signal at the corresponding location. Each of the measurements can include at least one of an RSSI, a round-trip time, a magnetic field strength, a temperature, a sound level, or an air pressure level.

The location fingerprint data can include multi-dimensional data having an environment variable dimension and a location dimension. The environment variable dimension of the location fingerprint data can correspond to the one or more environment variables. The location dimension of the location fingerprint data corresponds to coordinates of the one or more locations. The location dimension can include a longitude sub-dimension, a latitude sub-dimension, and an altitude sub-dimension. One or more values in the location fingerprint data at a given location and given environment variable corresponds to a probability distribution that includes an expected value and a variance of the environment variable at the given location.

The location server can determine the location fingerprint data of a venue by surveying the venue. In a survey, the location server can receive, from a sampling device (e.g., sampling device 202 of FIG. 5), measurements of signals from the one or more signal sources at one or more sampling locations. The location server can extrapolate an estimated measurement of the environment variables at each of the locations from the measurement of signals at the one or more sampling locations. The location server can then generate the location fingerprint data based on the received measurements, the extrapolated measurements, and the corresponding locations.

In some implementations, extrapolating the estimated measurement can include determining an attenuation of the measurements of signals based on the constraints. The constraints can include one or more walls, floors, or columns.

In some implementations, the location server can determine the location fingerprint data of a venue by prediction. Determining the location fingerprint data by prediction can include receiving a map of the venue, and receiving location coordinates of a signal source. The location coordinates can be absolute coordinates (e.g., latitude, longitude, and altitude) or relative coordinates (e.g., on second floor, north wall, three meters from the west corner). The location server can determine multiple locations and designate the locations as sampling points. The location server can determine a transmission characteristics of the signal source. The transmission characteristics can include a propagation pattern (e.g., a rate of attenuation) of a signal from the signal source in space and in various structural barriers (e.g., various types of walls and columns). For each of the sampling points, the location server can determine an expected measurement and a variance of a signal from the signal source based on a location of the signal source, spaces and barriers between the signal source and the sampling point, an estimated propagation pattern of the signal from the signal source in the spaces, and an estimated propagation pattern of the signal from the signal source in the barriers. The location server can store the expected measurements, the variance, an identifier of the signal source, and the corresponding location as the location fingerprint data.

The location server can provide (1208) map tiles including the location fingerprint data and an identifier of the venue to a mobile device for determining a location of the mobile device at the venue. Providing a first map tile including corresponding location fingerprint data to the mobile device can occur upon an entrance of the mobile device into the venue. The location server can receive a request for location fingerprint data of a venue from the mobile device. In some implementations, the request can be triggered when the mobile device loses reception of GPS signals. The request can include a last location determined by the GPS signals.

The location server can determine a venue located at the last location, and provide the location fingerprint data of the venue to the mobile device. In some implementations, the request can be triggered when the mobile device is turned on inside a venue and receives a user request for location determination. The mobile device can send the request to the location server through a wireless access point. Based on an identifier of the wireless access point, the location server can determine a venue and provide location fingerprint data of the venue to the mobile device. As the mobile device moves to different regions associated with different map tiles, the mobile device sends requests to the location server to request additional map tiles.

Figure 16:
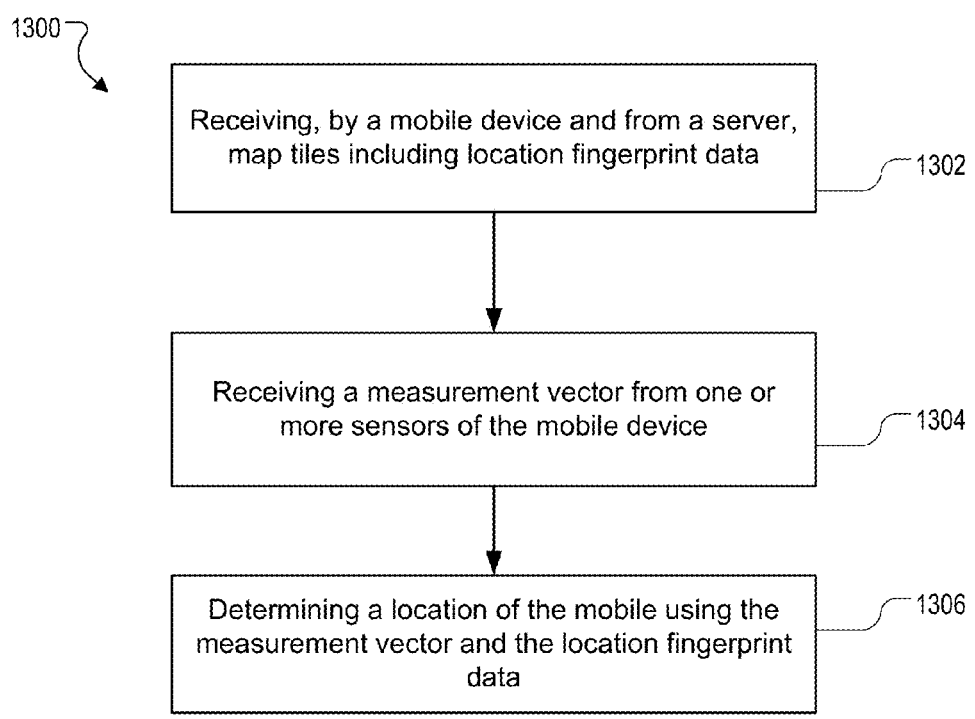
FIG. 16 is a flowchart of an exemplary procedure of estimating a location using location fingerprint data.

FIG. 16 is a flowchart of exemplary procedure 1300 of estimating a location using location fingerprint data. Procedure 1300 can be performed by a mobile device, e.g., mobile device 106 of FIG. 1.

The mobile device can receive (1302), from a server (e.g., location server 102 of FIG. 1), map tiles including location fingerprint data. The location fingerprint data can include multiple locations at a venue and a fingerprint of each location. The venue can include a space accessible by a pedestrian and one or more constraints of movement of the pedestrian. Each fingerprint can include one or more expected measurements of an environment variable at the corresponding location. Each environment variable can include a signal from a signal source detectable by the mobile device. The one or more signal sources can include at least one of an RF source (e.g., a wireless access point), a light source, a sound source, a magnetic source, or a heat source. The one or more expected measurements can include at least one of an RSSI, a round-trip time, a magnetic field strength, a temperature, a noise level, or an air pressure level.

The mobile device can receive the location fingerprint data by request. The mobile device can request a map tile including the location fingerprint data from the server when the mobile device determines that the mobile device is located in proximity to the venue based on a threshold. For example, the mobile device can determine, based on GPS signals and a map stored on the mobile device, that the mobile device is located within a threshold distance to a building. The mobile device can then request a first map tile including location fingerprint data of the first floor of the building from the server. The mobile device can receive the first map tile including corresponding location fingerprint data in response. As the mobile device moves to different regions in the building, the mobile device may request additional map tiles and corresponding location fingerprint data from the server.

The mobile device can receive (1304) a measurement vector from one or more sensors of the mobile device. The measurement vector can include one or more readings of the one or more sensors on the environment variable.

The mobile device can determine (1306) a location of the mobile device at the venue using the measurement vector and the location fingerprint data. Determining the location can include performing a statistical classification categorizing the measurement vector into one or more possible locations where the measurement vector can be received by the one or more sensors. Each possible location can be associated with a likelihood that the measurement vector matching a fingerprint of the respective possible location. Performing the statistical classification can include categorizing, based on training data, a sample vector to one or more categories each being associated with a probability that the sample vector belongs to the corresponding category. The mobile device can designate the location fingerprint data as the training data. The mobile device can designate the measurement vector as the sample vector. The one or more categories each can correspond to a possible location of the mobile device at the venue. The probability associated with each category can indicate a likelihood that the mobile device is located at the possible location corresponding to the category.

The mobile device can determine the probability associated with each category. Determining the probability can include determining a point-wise kernel estimation of a probability density of the measurement vector is measured at each of the possible locations. The point-wise kernel estimation can have a kernel function. The mobile device can apply the kernel function to a difference between the measurement vector and a fingerprint of the respective possible location. The kernel function can be a symmetric function that integrates to one (e.g., a Gaussian function).

In some implementations, the mobile device can apply the kernel function to an a priori domain provided by a particle filter. The a priori domain can be a portion of search space represented in the location fingerprint data selected before the probability densities are calculated. The a priori domain can be provided by a particle filter. For example, the a priori domain can be an a posteriori state estimate from the particle filter.

In some implementations, determining the location of the mobile device comprises aggregating statistics of a group of possible locations. In some implementations, determining the location of the mobile device can include calculating the location using the group of locations based on a context. The context can be a motion context. The context can include one or more readings of at least one of an accelerometer, a magnetic sensor, a gyroscope, or a barometer.

Figure 17:
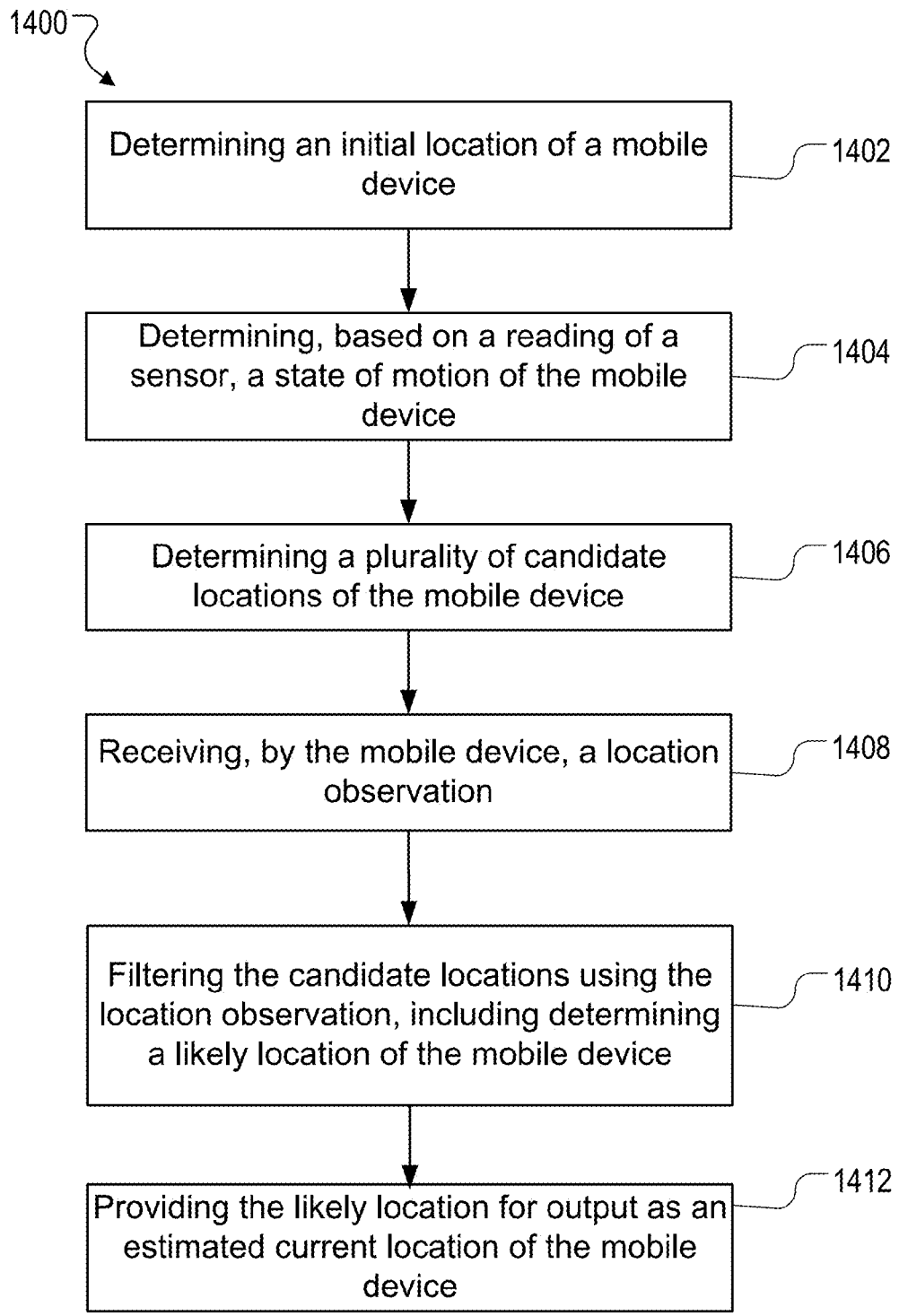
FIG. 17 is a flowchart of an exemplary procedure of estimating a location using a particle filter.

FIG. 17 is a flowchart of exemplary procedure 1400 of estimating a location using a particle filter. Exemplary procedure 1400 can be performed by a mobile device, e.g., mobile device 106 of FIG. 4.

The mobile device can determine (1402) an initial location of the mobile device. The initial location can be at a venue (e.g., inside of a building). The venue can include a space accessible by a pedestrian and one or more constraints of movement of the pedestrian. The initial location can be an a priori location estimate being associated with a given uncertainty value. In some implementations, determining the initial location can include estimating the initial location based on a prior location observation using scan analyzer 116 of FIG. 4. In some implementations, when an initial observation is unavailable, the initial location can be a random location at or near the venue having an initial uncertainty value (e.g., plus or minus 1000 meters), or a last known location determined by GPS signals having an initial uncertainty value (e.g., a value calculated based on time of the last GPS location determination and current time). When the mobile device has no prior location knowledge (e.g., when a new device is turned on for the first time inside of a building), the mobile device can determine that the initial location is a random location, and the uncertainty value is infinity.

The mobile device can determine (1404), based on a reading of a sensor of the mobile device, a state of motion of the mobile device. Determining the state of motion can include determining at least one of a speed or a heading of the mobile device, or rate of change of the speed or heading of the mobile device. The speed, heading, and rate of change of the speed or heading can be determined based on a reading of at least one of an accelerometer, a magnetometer, a barometer, or a gyroscope of the mobile device.

The mobile device can determine (1406) multiple candidate location of the mobile device based at least in part on the initial location, the state of motion, and a map of the venue specifying the one or more constraints. Determining the candidate locations can include determining whether the mobile device is stationary. If the mobile device is stationary, the mobile device can generate the candidate locations based on a state space system noise model, e.g., by generating the candidate locations randomly around the initial location. If the mobile device moves, the mobile device can determine a likelihood that the mobile device is moving from the initial location in a direction that avoids the constraints. The mobile device can then generate the candidate locations. The mobile device can generate more candidate locations in a direction that is associated with a higher likelihood (e.g., a direction that is along a heading of the mobile device).

In some implementations, determining the likelihood that the mobile device is moving from the initial location in the direction that avoids the constraints can include determining a path (e.g., hallway) of the venue based on the constraints. The mobile device can determine a destination type of a point on the path based on the map. The destination type (e.g., office, cafeteria, or lobby) can be indicative of a likelihood that the pedestrian will move toward a destination of the path when the pedestrian is moving along the path. The point can be located at an end of the path or on the path. The mobile device can determine the likelihood that the mobile device is moving from the initial location in the direction based on the destination type of the path. For example, if the destination type of a point in the middle of the path is a cafeteria, lobby, or conference room, the mobile device can determine that a pedestrian is more likely to enter the cafeteria or lobby than if the destination type of the point is an office.

The mobile device can determine whether the candidate locations are depleted. The mobile device can determine that a count of the one or more candidate locations satisfies a depletion threshold. Upon such determination, the mobile device can generate a candidate location at a random location in the venue for location determination.

The mobile device can receive (1408) a location observation. The location observation can include an estimated location of the mobile device in the space of the venue. The estimated location can be determined based on readings of one or more sensors of the mobile device and location fingerprint data describing attributes of signals measurable by the one or more sensors when the mobile device is at the venue.

The mobile device can filter (1410) the candidate locations using the location observation, including determining a likely location of the mobile device based on the candidate locations, the observation, and a probability model. Determining the likely location of the mobile device can include determining a probability density based on the candidate locations.

The mobile device can provide (1412) the likely location for output as a current location of the mobile device. The mobile device can designate the current location as an initial location for estimating a next current location of the mobile device. Providing the likely location for output can include displaying the likely location as a pin on a map of the venue displayed on a screen of the mobile device.

Figure 18:
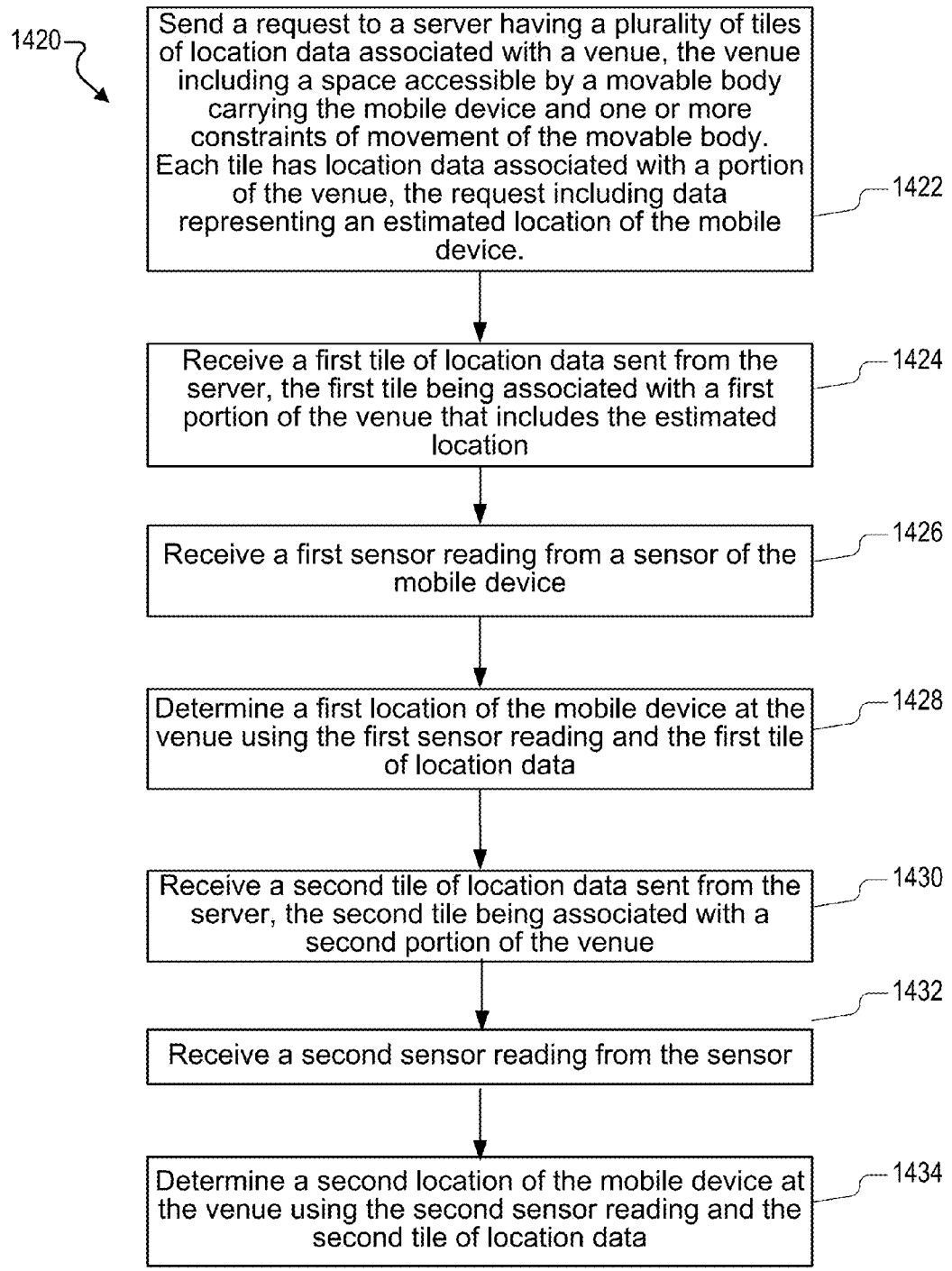
FIGS. 18-20 are flowcharts of exemplary procedures of estimating locations using map tiles.

FIG. 18 is a flowchart of exemplary procedure 1420 of estimating a location using map tiles. Exemplary procedure 1420 can be performed by a mobile device, e.g., mobile device 106 of FIG. 4.

The mobile device can send (1422) a request to a server having a plurality of tiles of location data associated with a venue, the venue including a space accessible by a movable body carrying the mobile device and one or more constraints of movement of the movable body. Each tile has location data associated with a portion of the venue, the request including data representing an estimated location of the mobile device. The mobile device can receive (1424) a first tile of location data sent from the server, the first tile being associated with a first portion of the venue that includes the estimated location.

The mobile device can receive (1426) a first sensor reading from a sensor of the mobile device. The mobile device can determine (1428) a first location of the mobile device at the venue using the first sensor reading and the first tile of location data. The mobile device can receive (1430) a second tile of location data sent from the server, the second tile being associated with a second portion of the venue. The mobile device can receive (1432) a second sensor reading from the sensor. The mobile device can determine (1434) a second location of the mobile device at the venue using the second sensor reading and the second tile of location data.

Figure 19:
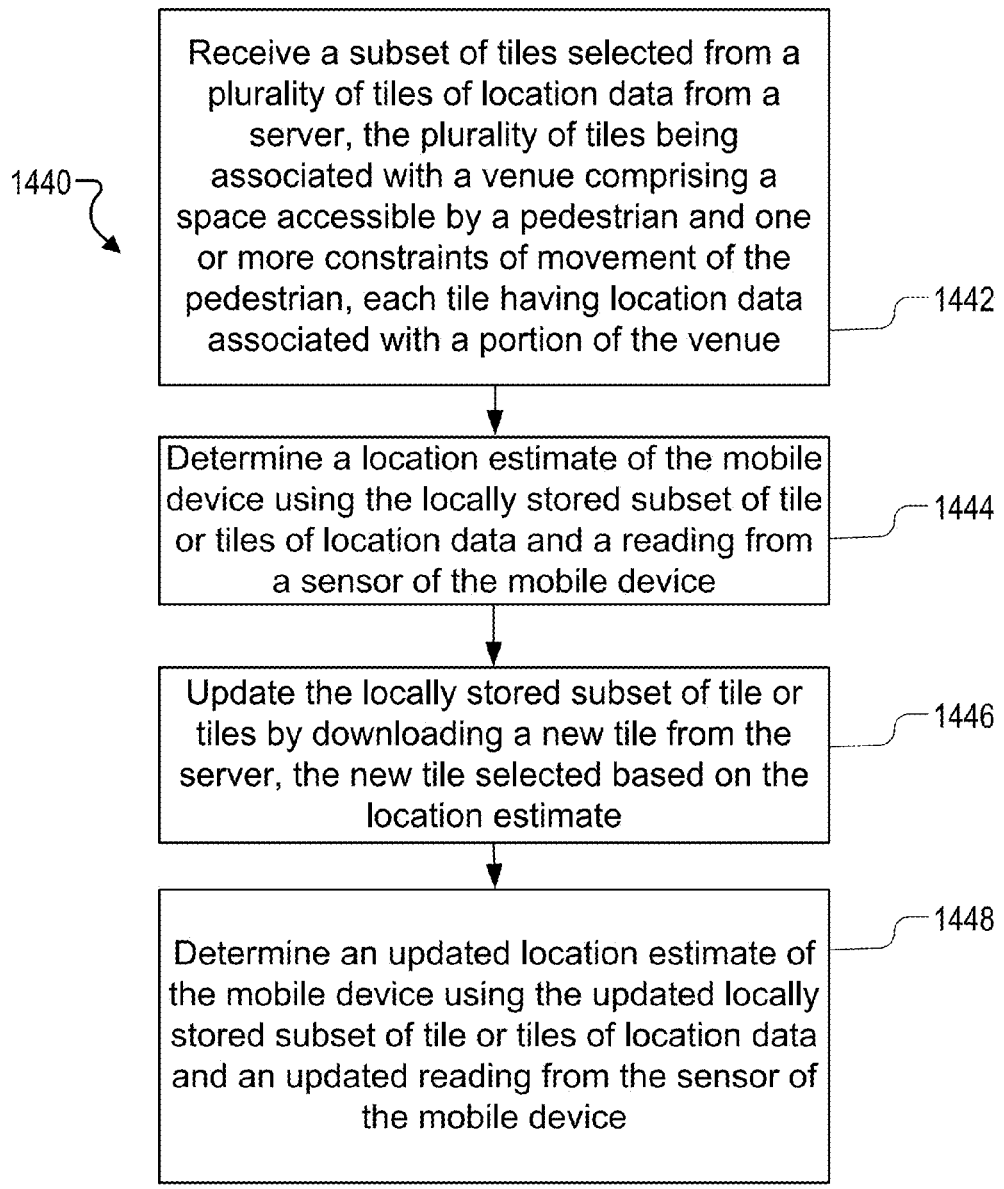

FIG. 19 is a flowchart of exemplary procedure 1440 of estimating a location using map tiles. Exemplary procedure 1440 can be performed by a mobile device, e.g., mobile device 106 of FIG. 4.

The mobile device can receive (1442) a subset of tiles selected from a plurality of tiles of location data from a server, the plurality of tiles being associated with a venue comprising a space accessible by a pedestrian and one or more constraints of movement of the pedestrian, each tile having location data associated with a portion of the venue. The mobile device can determine (1444) a location estimate of the mobile device using the locally stored subset of tile or tiles of location data and a reading from a sensor of the mobile device. The mobile device can update (1446) the locally stored subset of tile or tiles by downloading a new tile from the server, the new tile selected based on the location estimate. The mobile device can determine (1448) an updated location estimate of the mobile device using the updated locally stored subset of tile or tiles of location data and an updated reading from the sensor of the mobile device.

Figure 20:
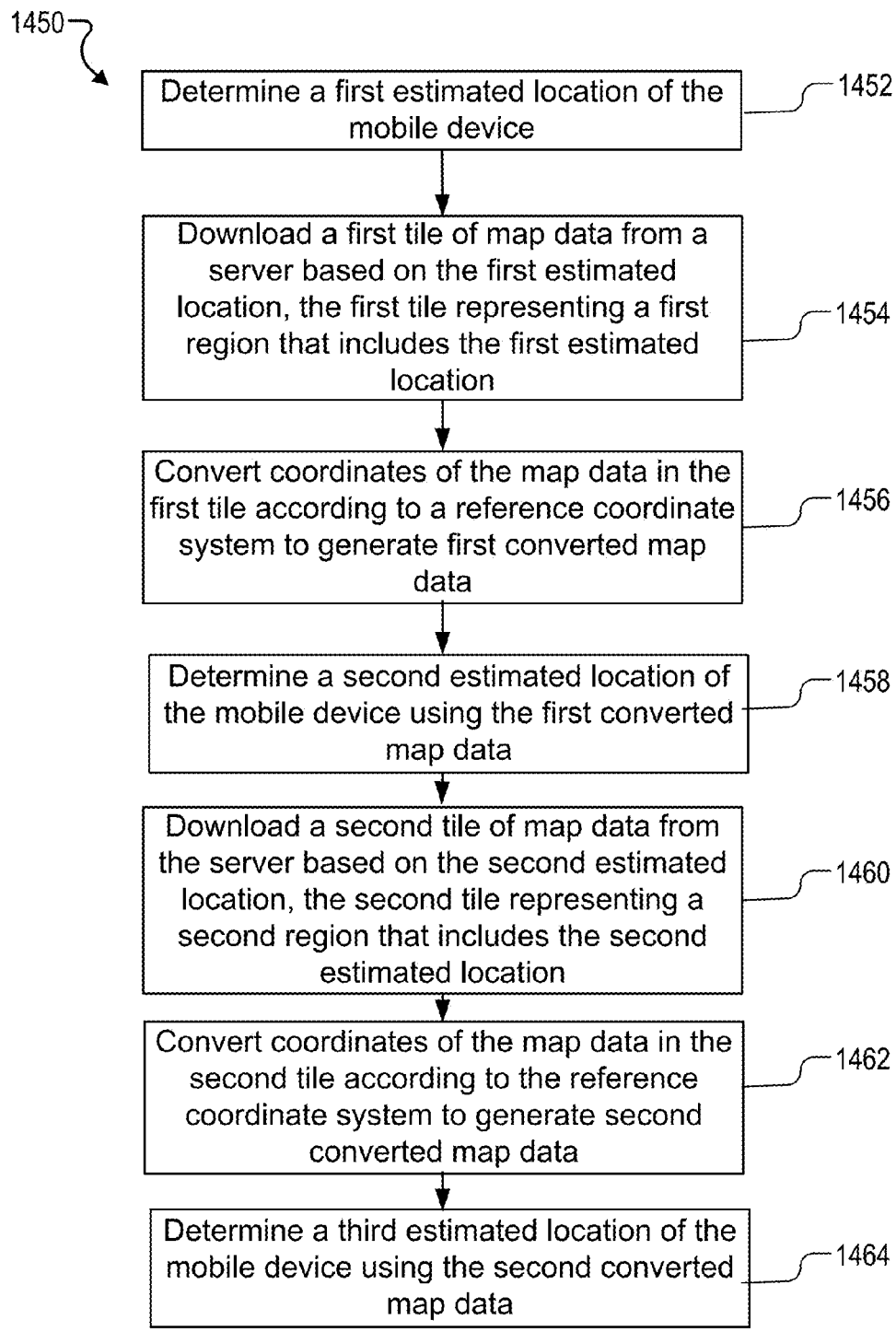

FIG. 20 is a flowchart of exemplary procedure 1450 of estimating a location using map tiles. Exemplary procedure 1440 can be performed by a mobile device, e.g., mobile device 106 of FIG. 4.

The mobile device can determine (1452) a first estimated location of the mobile device. The mobile device can download (1454) a first tile of map data from a server based on the first estimated location, the first tile representing a first region that includes the first estimated location. The mobile device can convert (1456) coordinates of the map data in the first tile according to a reference coordinate system to generate first converted map data. The mobile device can determine (1458) a second estimated location of the mobile device using the first converted map data. The mobile device can download (1460) a second tile of map data from the server based on the second estimated location, the second tile representing a second region that includes the second estimated location. The mobile device can convert (1462) coordinates of the map data in the second tile according to the reference coordinate system to generate second converted map data. The mobile device can determine (1464) a third estimated location of the mobile device using the second converted map data.

Exemplary System Architecture

Figure 21:
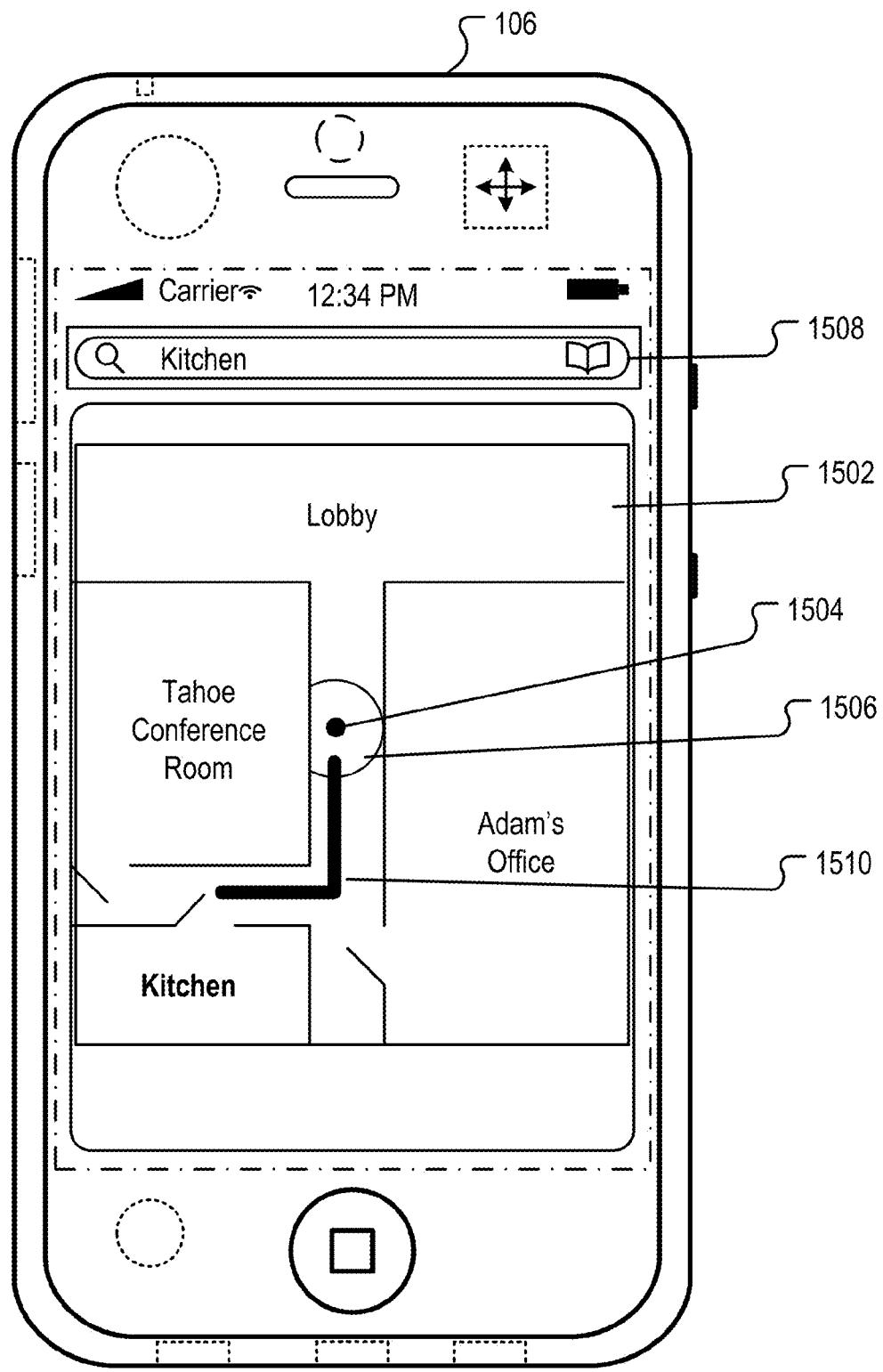
FIG. 21 is an exemplary user interface for displaying a location of a mobile device at a venue.

FIG. 21 is an exemplary user interface for displaying a location of a mobile device at a venue. The mobile device can be mobile device 106 as described in reference to FIG. 4.

The user interface can include map 1502 of a venue, e.g., a building. Map 1502 can include walls, spaces, rooms, and room designations of a particular floor. The mobile device can estimate a current location of the mobile device, and provide the current location for display as location marker 1504 in map 1502 on a display device of the mobile device. The mobile device can determine which floor is displayed based on an altitude aspect of the estimate of a current location of the mobile device. The estimated location can include an uncertainty region. The uncertainty region can include a region around the estimated current location where probability density of the mobile device is located in locations in the region that exceeds a threshold. The uncertainty region can be displayed as uncertainty region area 1506 around location marker 1504. Uncertainty region and uncertainty region area 1506 need not be a perfectly circular area, given locations rendered impossible by movement constraints in venue 204 and motion speed of a pedestrian.

The user interface can include search box 1508. Search box 1508 can be configured to receive input for a search term. Upon receiving the search term through search box 1508, the mobile device can search data associated with map 1502 and determine if the search term matches a portion of the venue. The mobile device can emphasize or otherwise mark the portion if a match is found. For example, when the mobile device receives a search term "kitchen" and a portion of the venue is designated as "kitchen," the mobile device can highlight the kitchen portion on map 1502. In some implementations, the mobile device can designate the found portion (e.g., "kitchen") as a destination. The mobile device can determine path 1510 that leads from the current location to the destination, and display path 1510 on map 1502.

Exemplary System Architecture

Figure 22:
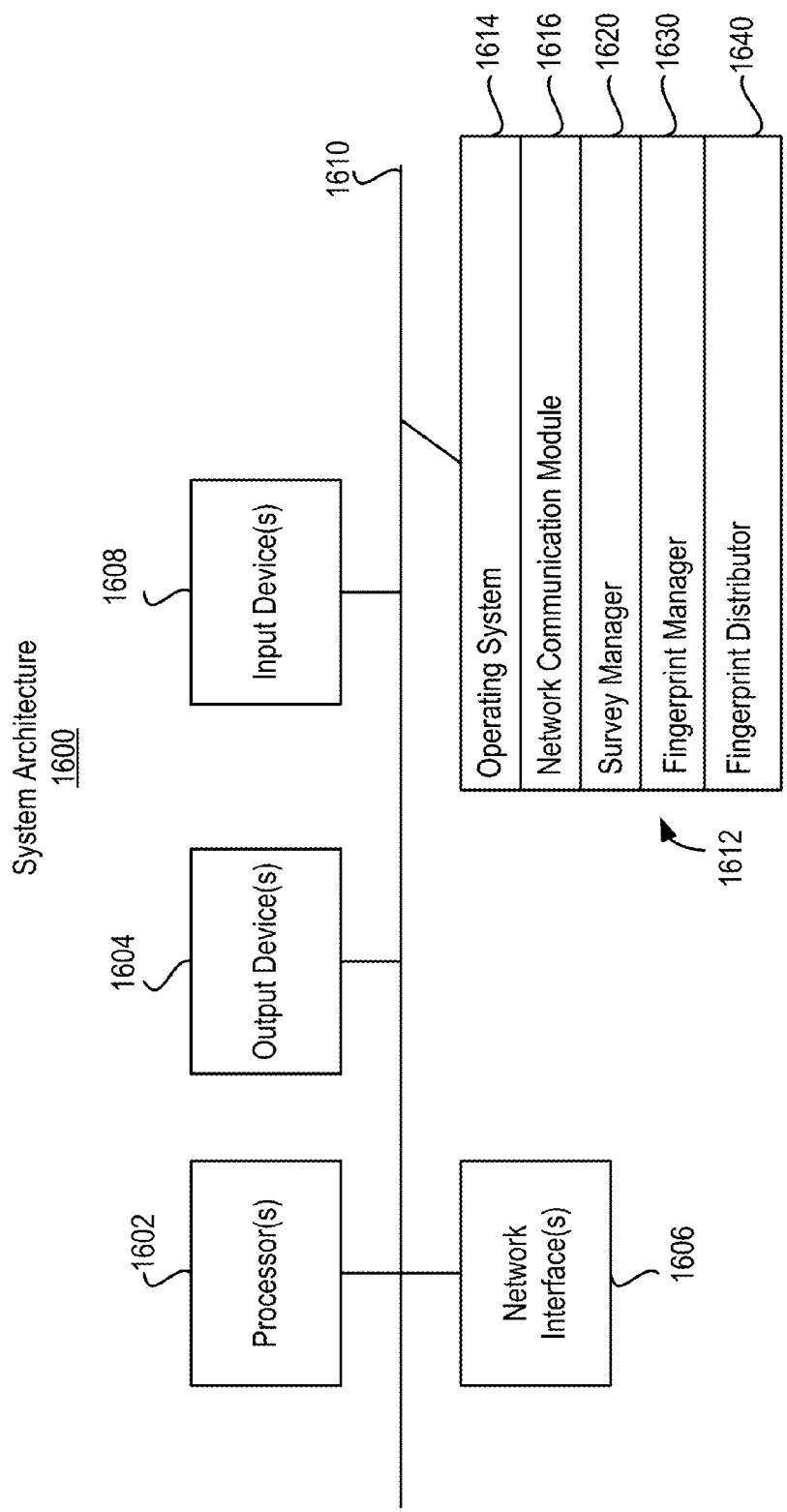
FIG. 22 is a block diagram of an exemplary system architecture for implementing the features and operations of FIGS. 4-21.

FIG. 22 is a block diagram of an exemplary system architecture for implementing the features and operations of FIGS. 4-21. Other architectures are possible, including architectures with more or fewer components. In some implementations, architecture 1600 includes one or more processors 1602 (e.g., dual-core Intel® Xeon® Processors), one or more output devices 1604 (e.g., LCD), one or more network interfaces 1606, one or more input devices 1608 (e.g., mouse, keyboard, touch-sensitive display) and one or more computer-readable mediums 1612 (e.g., RAM, ROM, SDRAM, hard disk, optical disk, flash memory, etc.). These components can exchange communications and data over one or more communication channels 1610 (e.g., buses), which can utilize various hardware and software for facilitating the transfer of data and control signals between components.

The term "computer-readable medium" refers to a medium that participates in providing instructions to processor 1602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1612 can further include operating system 1614 (e.g., a Linux® operating system), network communication module 1616, survey manager 1620, fingerprint manager 1630, and fingerprint distributor 1640. Operating system 1614 can be multi-user, multiprocessing, multitasking, multithreading, real time, etc. Operating system 1614 performs basic tasks, including but not limited to: recognizing input from and providing output to devices 1606, 1608; keeping track and managing files and directories on computer-readable mediums 1612 (e.g., memory or a storage device); controlling peripheral devices; and managing traffic on the one or more communication channels 1610. Network communications module 1616 includes various components for establishing and maintaining network connections (e.g., software for implementing communication protocols, such as TCP/IP, HTTP, etc.).

Survey manager 1620 can include computer instructions that, when executed, cause processor 1602 to provide survey instructions and maps to a sampling device (e.g., sampling device 202 of FIG. 5) and receive survey data from the sampling device. Fingerprint manager 1630 can include computer instructions that, when executed, cause processor 1602 to perform operations of signal estimator 110 and fingerprint engine 108 as described above in reference to FIG. 4. Fingerprint distributor 1640 can include computer instructions that, when executed, cause processor 1602 to respond to a fingerprint request from a mobile device (e.g., mobile device 106 of FIG. 4), including sending location fingerprint data to the requesting mobile device.

Architecture 1600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 23:
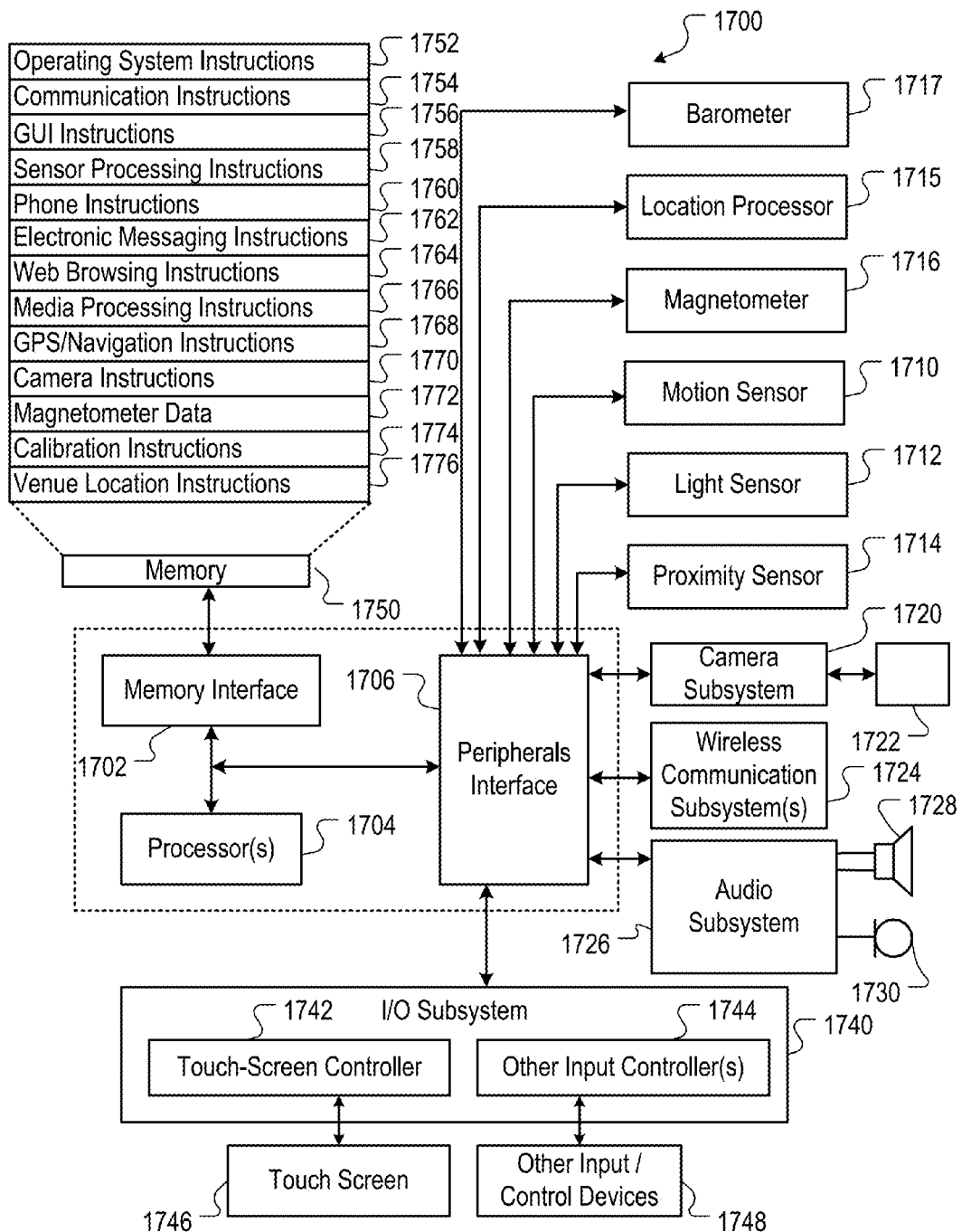
FIG. 23 is a block diagram illustrating an exemplary device architecture of a mobile device implementing the features and operations described in reference to FIGS. 4-21.

FIG. 23 is a block diagram of an exemplary architecture 1700 for the mobile devices of FIGS. 4-21. A mobile device (e.g., mobile device 106) can include memory interface 1702, one or more data processors, image processors and/or processors 1704, and peripherals interface 1706. Memory interface 1702, one or more processors 1704 and/or peripherals interface 1706 can be separate components or can be integrated in one or more integrated circuits. Processors 1704 can include application processors, baseband processors, and wireless processors. The various components in mobile device 106, for example, can be coupled by one or more communication buses or signal lines.

Sensors, devices, and subsystems can be coupled to peripherals interface 1706 to facilitate multiple functionalities. For example, motion sensor 1710, light sensor 1712, and proximity sensor 1714 can be coupled to peripherals interface 1706 to facilitate orientation, lighting, and proximity functions of the mobile device. Location processor 1715 (e.g., GPS receiver) can be connected to peripherals interface 1706 to provide geopositioning. Electronic magnetometer 1716 (e.g., an integrated circuit chip) can also be connected to peripherals interface 1706 to provide data that can be used to determine the direction of magnetic North. Thus, electronic magnetometer 1716 can be used as an electronic compass. Motion sensor 1710 can include one or more accelerometers configured to determine change of speed and direction of movement of the mobile device. Barometer 1717 can include one or more devices connected to peripherals interface 1706 and configured to measure pressure of atmosphere around the mobile device.

Camera subsystem 1720 and an optical sensor 1722, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 1724, which can include radio frequency receivers and transmitters and/or optical (e.g., infrared) receivers and transmitters. The specific design and implementation of the communication subsystem 1724 can depend on the communication network(s) over which a mobile device is intended to operate. For example, a mobile device can include communication subsystems 1724 designed to operate over a GSM network, a GPRS network, an EDGE network, a Wi-Fi™ or WiMax™ network, and a Bluetooth™ network. In particular, the wireless communication subsystems 1724 can include hosting protocols such that the mobile device can be configured as a base station for other wireless devices.

Audio subsystem 1726 can be coupled to a speaker 1728 and a microphone 1730 to facilitate voice-enabled functions, such as voice recognition, voice replication, digital recording, and telephony functions. Audio subsystem 1726 can be configured to receive voice commands from the user.

I/O subsystem 1740 can include touch screen controller 1742 and/or other input controller(s) 1744. Touch-screen controller 1742 can be coupled to a touch screen 1746 or pad. Touch screen 1746 and touch screen controller 1742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1746.

Other input controller(s) 1744 can be coupled to other input/control devices 1748, such as one or more buttons, rocker switches, thumb-wheel, infrared port, USB port, and/or a pointer device such as a stylus. The one or more buttons (not shown) can include an up/down button for volume control of speaker 1728 and/or microphone 1730.

In one implementation, a pressing of the button for a first duration may disengage a lock of the touch screen 1746; and a pressing of the button for a second duration that is longer than the first duration may turn power to mobile device 106 on or off. The user may be able to customize a functionality of one or more of the buttons. The touch screen 1746 can, for example, also be used to implement virtual or soft buttons and/or a keyboard.

In some implementations, mobile device 106 can present recorded audio and/or video files, such as MP3, AAC, and MPEG files. In some implementations, mobile device 106 can include the functionality of an MP3 player. Mobile device 106 may, therefore, include a pin connector that is compatible with the iPod. Other input/output and control devices can also be used.

Memory interface 1702 can be coupled to memory 1750. Memory 1750 can include high-speed random access memory and/or non-volatile memory, such as one or more magnetic disk storage devices, one or more optical storage devices, and/or flash memory (e.g., NAND, NOR). Memory 1750 can store operating system 1752, such as Darwin, RTXC, LINUX, UNIX, OS X, WINDOWS, or an embedded operating system such as VxWorks. Operating system 1752 may include instructions for handling basic system services and for performing hardware dependent tasks. In some implementations, operating system 1752 can include a kernel (e.g., UNIX kernel).

Memory 1750 may also store communication instructions 1754 to facilitate communicating with one or more additional devices, one or more computers and/or one or more servers. Memory 1750 may include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions; media processing instructions 1766 to facilitate media processing-related processes and functions; GPS/Navigation instructions 1768 to facilitate GPS and navigation-related processes and instructions; camera instructions 1770 to facilitate camera-related processes and functions; magnetometer data 1772 and calibration instructions 1774 to facilitate magnetometer calibration. The memory 1750 may also store other software instructions (not shown), such as security instructions, web video instructions to facilitate web video-related processes and functions, and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1750. Memory 1750 can include venue location instructions 1776 that can be used to request location fingerprint data and determine a location of the mobile device when the mobile device is at a venue, e.g., inside of a building where GPS signals are unavailable.

Each of the above identified instructions and applications can correspond to a set of instructions for performing one or more functions described above. These instructions need not be implemented as separate software programs, procedures, or modules. Memory 1750 can include additional instructions or fewer instructions. Furthermore, various functions of the mobile device may be implemented in hardware and/or in software, including in one or more signal processing and/or application specific integrated circuits.

Exemplary Operating Environment

Figure 24:
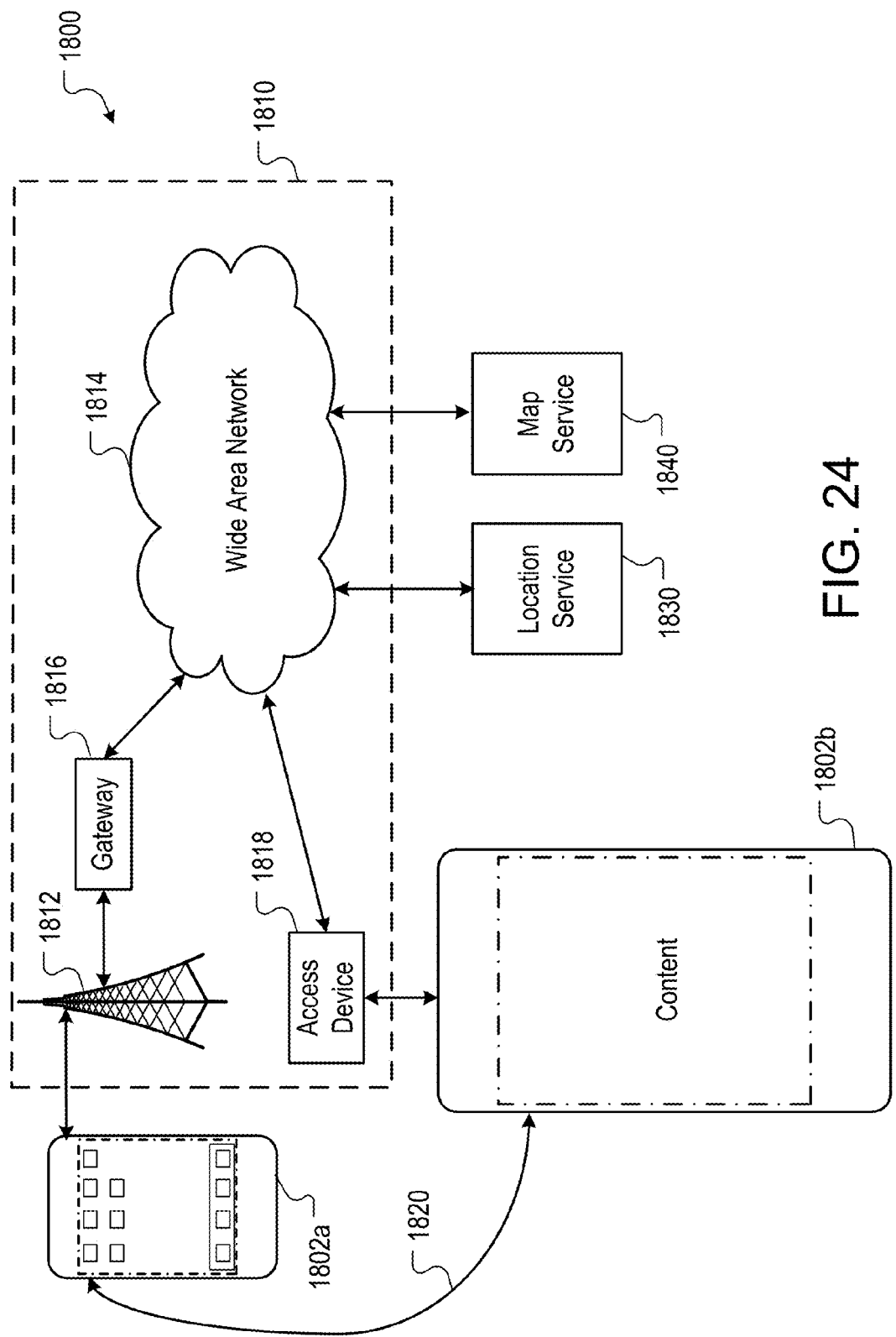
FIG. 24 is a block diagram of an exemplary network operating environment for the mobile devices of FIGS. 4-21.

FIG. 24 is a block diagram of an exemplary network operating environment 1800 for the mobile devices of FIGS. 4-21. Mobile devices 1802*a* and 1802*b* can, for example, communicate over one or more wired and/or wireless networks 1810 in data communication. For example, a wireless network 1812, e.g., a cellular network, can communicate with a wide area network (WAN) 1814, such as the Internet, by use of a gateway 1816. Likewise, an access device 1818, such as an 802.11g wireless access point, can provide communication access to the wide area network 1814.

In some implementations, both voice and data communications can be established over wireless network 1812 and the access device 1818. For example, mobile device 1802*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1812, gateway 1816, and wide area network 1814 (e.g., using Transmission Control Protocol/Internet Protocol (TCP/IP) or User Datagram Protocol (UDP)). Likewise, in some implementations, the mobile device 1802*b* can place and receive phone calls, send and receive e-mail messages, and retrieve electronic documents over the access device 1818 and the wide area network 1814. In some implementations, mobile device 1802a or 1802b can be physically connected to the access device 1818 using one or more cables and the access device 1818 can be a personal computer. In this configuration, mobile device 1802a or 1802b can be referred to as a "tethered" device.

Mobile devices 1802a and 1802b can also establish communications by other means. For example, wireless device 1802a can communicate with other wireless devices, e.g., other mobile devices, cell phones, etc., over the wireless network 1812.

Likewise, mobile devices 1802a and 1802b can establish peer-to-peer communications 1820, e.g., a personal area network, by use of one or more communication subsystems, such as the Bluetooth™ communication devices. Other communication protocols and topologies can also be implemented.

The mobile device 1802a or 1802b can, for example, communicate with one or more services 1830 and 1840 over the one or more wired and/or wireless networks. For example, one or more location services 1830 can conduct surveys of venues, generate location fingerprint data for each venue, and provide the location fingerprint data to mobile device 1802a or 1802b. Map service 1840 can, for example, provide maps of venues, e.g., maps of structures of buildings to mobile device 1802a or 1802b.

Mobile device 1802a or 1802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1802a or 1802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. In the description above, a mobile device downloads indoor map tile on an as-needed basis from a map server. The feature of downloading map tiles can also be applied to outdoor applications. For example, in a city having dense tall buildings, GPS signals may be weak or have multipath interference. Location fingerprint data based on WiFi and/or cell phone signals may be used to determine location. As a pedestrian walks around the city, a mobile device may use a GPS system to determine its location when the GPS signals are strong, and switch to using a location estimator using a state space model and a fingerprint engine to determine its location. The map data for enabling the location estimator and the fingerprint engine may be divided into map tiles. As the user walks to different regions in the city, the mobile device may request different map tiles from a map server and use the map tiles to determine its location.

When a mobile device arrives at a venue and requests a first map tile from a map server, the mobile device can determine which map tile to request based on a previous location estimate determined according to, e.g., GPS signals or WiFi/cell tower triangulation. If the mobile device is powered up inside a building and does not have prior location information, the mobile device can prompt the user to enter the name of the venue, such as the name of the building or shopping mall. The mobile device then requests one or more map tiles from the map server based on the user input.

The particle filter engine 118 (FIG. 4) can be replaced with other types of location estimators that use state space models. The sensors 114 can sense environment variables other than those described above.

Downloading map tiles is not limited to mobile devices that can be carried by a pedestrian. Other types of machines can also download map tiles on an as-needed basis in order to reduce the requirement for memory storage and to allow quick determination of location without having the need to wait for a long time for downloading map data. For example, in a driver-less vehicle may download different map tiles as it drives to different regions and use the map tiles to determine its location. A robot may download different map tiles as it moves to different regions (either indoors or outdoors) and use the map tiles to determine its location. A drone may download different map tiles as it flies to different regions and use the map tiles to determine its location.

What is claimed is:

1. A computer-implemented method, comprising:
sending, from a mobile device, a request to a server having a plurality of tiles of location data associated with a venue, the venue comprising a space accessible by a movable body carrying the mobile device and one or more constraints of movement of the movable body, each tile having location data associated with a portion of the venue, the request including data representing an estimated location of the mobile device;
receiving, at the mobile device, a first tile of location data sent from the server, the first tile being associated with a first portion of the venue that includes the estimated location;
receiving a first sensor reading from a sensor of the mobile device;
determining a first location of the mobile device at the venue using the first sensor reading and the first tile of location data;
receiving, at the mobile device, a second tile of location data sent from the server, the second tile being associated with a second portion of the venue;
receiving a second sensor reading from the sensor; and
determining a second location of the mobile device at the venue using the second sensor reading and the second tile of location data.

2. The method of claim 1 in which the location data in each tile include local coordinates that use a local reference point in the region associated with the tile, the tile including information indicating an offset of the local reference point relative to a global reference point of the venue.

3. The method of claim 2, comprising converting coordinates of the location data of the first tile to generate global location data that use the global reference point of the venue as reference.

4. The method of claim 3 in which determining the location of the mobile device comprises determining the location of the mobile device using the global location data.

5. The method of claim 2, comprising converting coordinates of the location data of two or more tiles to generate global location data that use the global reference point of the venue as reference, and merging the global location data from the two or more tiles.

6. The method of claim 1 in which each tile comprises at least one of location fingerprint data, data on pathways, or data on the one or more constraints of movement of the movable body.

7. The method of claim 1 in which the location data in each tile comprises at least one of location fingerprint data, data on pathways, and data on the one or more constraints of movement of the pedestrian, and
- determining the first location of the mobile device comprises
  - generating an observation based on the sensor reading and the location fingerprint data, and
  - implementing a location estimator using a state space model to determine the first location based on the observation, the data on pathways, and the data on the one or more constraints.

8. The method of claim 1, comprising sending from the mobile device a request to the server to request the second tile upon detecting that the mobile device is moving out of the first portion of the venue associated with the first tile, or upon detecting that the mobile device is moving toward the second portion of the venue associated with the second tile.

9. A computer-implemented method, comprising:
- receiving, at a mobile device, a subset of tiles selected from a plurality of tiles of location data from a server, the plurality of tiles being associated with a venue comprising a space accessible by a pedestrian and one or more constraints of movement of the pedestrian, each tile having location data associated with a portion of the venue;
- determining a location estimate of the mobile device using the locally stored subset of tile or tiles of location data and a reading from a sensor of the mobile device;
- updating the locally stored subset of tile or tiles by downloading a new tile from the server, the new tile selected based on the location estimate; and
- determining an updated location estimate of the mobile device using the updated locally stored subset of tile or tiles of location data and an updated reading from the sensor of the mobile device.

10. The method of claim 9 in which the location data in each tile include coordinates that use a local reference point associated with the tile, the tile including information indicating an offset of the local reference point relative to a global reference point of the venue.

11. The method of claim 10, comprising converting coordinates of the location data of the locally stored tile to generate converted location data that use the global reference point of the venue as reference.

12. The method of claim 11 in which determining the location estimate of the mobile device comprises determining the location estimate of the mobile device using the converted location data and the sensor reading.

13. The method of claim 10, comprising converting coordinates of the location data of two or more tiles to generate converted location data that use the global reference point of the venue as reference, and merging the converted location data from the two or more tiles.

14. The method of claim 9 in which the location data in each tile comprises at least one of location fingerprint data, data on pathways, or data on the one or more constraints of movement of the pedestrian.

15. The method of claim 9, comprising continuously updating the tiles locally stored at the mobile device so that as the mobile device moves to various regions in the venue, the mobile device maintains a tile that is associated with a region that includes the location estimate of the mobile device and at least one additional tile.

16. The method of claim 9 in which the location data in each tile comprises at least one of location fingerprint data, data on pathways, and data on the one or more constraints of movement of the pedestrian, and
- determining the location estimate of the mobile device comprises
  - generating an observation based on the sensor reading and the location fingerprint data, and
  - implementing a location estimator using a state space model to determine the first location based on the observation, the data on pathways, and the data on the one or more constraints.

17. A computer-implemented method, comprising:
- determining, at a mobile device, a first estimated location of the mobile device;
- downloading a first tile of map data from a server based on the first estimated location, the first tile representing a first region that includes the first estimated location;
- converting coordinates of the map data in the first tile according to a reference coordinate system to generate first converted map data;
- determining a second estimated location of the mobile device using the first converted map data;
- downloading a second tile of map data from the server based on the second estimated location, the second tile representing a second region that includes the second estimated location;
- converting coordinates of the map data in the second tile according to the reference coordinate system to generate second converted map data; and
- determining a third estimated location of the mobile device using the second converted map data.

18. The method of claim 17 in which the location data in each tile comprises at least one of location fingerprint data, data on pathways, and data on the one or more constraints of movement of the pedestrian, and
- determining the second estimated location of the mobile device comprises
  - generating an observation based on a sensor reading and the location fingerprint data, and
  - implementing a location estimator using a state space model to determine the second estimated location based on the observation, the data on pathways, and the data on the one or more constraints.

19. A mobile device comprising:
- a sensor to sense an environment variable;
- a storage configured to locally store a subset of a plurality of tiles associated with a venue, the venue comprising a space accessible by a movable body carrying the mobile device and one or more constraints of movement of the movable body, each tile having location data associated with a portion of the venue; and
- a processor configured to
  - determine a location estimate of the mobile device using the locally stored subset of tile or tiles of location data and a reading from the sensor, and
  - update the locally stored subset of tile or tiles based on the location estimate of the mobile device by downloading a new tile of location data from a server that stores the plurality of tiles associated with the venue.

20. The mobile device of claim 19 in which the location data in each tile comprises at least one of location fingerprint data, data on pathways, or data on the one or more constraints of movement of the movable body.

21. The mobile device of claim 20 in which the location data in each tile comprises location fingerprint data, data on pathways, and data on the one or more constraints of movement of the movable body, and the processor is configured to generate an observation based on the sensor reading and the fingerprint data, and implement a location estimator using a state space model for determining the location estimate based on the observation, the data on pathways, and the data on the one or more constraints.

22. The mobile device of claim 19 in which the location data in each tile comprises location fingerprint data that includes multi-dimensional data having an environment variable dimension and a location dimension, wherein:

the environment variable dimension of the location fingerprint data corresponds to the one or more environment variables;

the location dimension of the location fingerprint data corresponds to coordinates of the one or more locations; and one or more values in the location fingerprint data at a given location and given environment variable corresponds to a probability distribution that includes an expected value and a variance of the environment variable at the given location.

23. The mobile device of claim 19 in which the venue comprises multiple floors, and the plurality of tiles comprise a first tile associated with a first floor and a second tile associated with a second floor.

24. An apparatus comprising:

a computer storage medium storing instructions that, when executed by data processing apparatus, cause the data processing apparatus to perform operations comprising:

receive a subset of tiles selected from a plurality of tiles of location data from a server, the plurality of tiles being associated with a venue comprising a space accessible by a movable body and one or more constraints of movement of the movable body, each tile having location data associated with a portion of the venue, the mobile device locally storing a subset of tile or tiles less than all the tiles associated with the venue;

determine a location estimate of the mobile device using the locally stored subset of tile or tiles of location data and a reading from a sensor of the mobile device;

update the locally stored subset of tile or tiles by downloading a new tile from the server, the new tile selected based on the location estimate; and determine an updated location estimate of the mobile device using the updated locally stored subset of tile or tiles of location data and an updated reading from the sensor of the mobile device.

25. The apparatus of claim 24 in which the location data in each tile include coordinates that use a local reference point associated with the tile, the tile including information indicating an offset of the local reference point relative to a global reference point of the venue, and the computer storage medium further stores instructions that cause the data processing apparatus to convert coordinates of the location data of the locally stored tile to generate converted location data that use the global reference point of the venue as reference, and wherein determine the location estimate of the mobile device comprises determine the location estimate of the mobile device using the converted location data and the sensor reading.

* * * * *